(12) United States Patent
Suarez et al.

(10) Patent No.: US 9,571,205 B1
(45) Date of Patent: Feb. 14, 2017

(54) SYSTEMS APPROACH TO INTERFERENCE CANCELLATION

(71) Applicants: John Suarez, Princeton, NJ (US); Paul R. Prucnal, Princeton, NJ (US); Yanhua Deng, Minneapolis, MN (US); Andrew McCandless, Baton Rouge, LA (US)

(72) Inventors: John Suarez, Princeton, NJ (US); Paul R. Prucnal, Princeton, NJ (US); Yanhua Deng, Minneapolis, MN (US); Andrew McCandless, Baton Rouge, LA (US)

(73) Assignees: THE TRUSTEES OF PRINCETON UNIVERSITY, Princeton, NJ (US); BASCOM HUNTER TECHNOLOGIES, Baton Rouge, LA (US)

(*) Notice: Subject to any disclaimer, the term of this patent is extended or adjusted under 35 U.S.C. 154(b) by 98 days.

(21) Appl. No.: 14/223,917

(22) Filed: Mar. 24, 2014

Related U.S. Application Data

(63) Continuation-in-part of application No. 12/613,512, filed on Nov. 5, 2009, now Pat. No. 8,693,810, and a continuation of application No. 13/399,327, filed on Feb. 17, 2012, now Pat. No. 8,682,170.

(60) Provisional application No. 61/198,336, filed on Nov. 5, 2008, provisional application No. 61/488,521, filed on May 20, 2011.

(51) Int. Cl.
*H04B 10/61* (2013.01)

(52) U.S. Cl.
CPC ................................ *H04B 10/61* (2013.01)

(58) Field of Classification Search
CPC ............................................... H04B 10/61
See application file for complete search history.

(56) References Cited

U.S. PATENT DOCUMENTS

2014/0218240 A1* 8/2014 Kpodzo ............... G01S 5/0215
342/450

OTHER PUBLICATIONS

Suarez et al., "Incoherent Method of Optical Interference Cancellation for Radio-Frequency Communications", IEEE Journal of Quantum Electronics, vol. 45, No. 4, pp. 402-408, Mar. 25, 2009.

(Continued)

*Primary Examiner* — John M Bedtelyon
(74) *Attorney, Agent, or Firm* — Meagher Emanuel Laks Goldberg & Liao, LLP

(57) ABSTRACT

Disclosed is a system and method of combining optical interference cancellation with other methods of interference cancellation, including electronic cancellation, digital filtering, and beam steering algorithms, to remove co-located interference, remote interference of an unknown origin, and multipath interference components created by reflections of signals both known and unknown.

47 Claims, 26 Drawing Sheets

(56) References Cited

OTHER PUBLICATIONS

Suarez et al., "System-Level Performance and Characterization of Counter-Phase Optical Interference Cancellation", Journal of Lightwave Technology, vol. 28, No. 12, pp. 1821-1831, Jun. 15, 2010.
Ward et al., "Design and Fabrication of a multichannel adaptive optical processor (MADOP)", In-House Report, Rome Laboratory, Air Force Materiel Command, Griffiss Air Force Base, New York, RL-TR-92-333, Dec. 1992.
Brahimi et al. "Cad of Microwave Optical Systems for Time &Frequency Applications" The European Forum for Time and Frequency, vol. 8, No. 162, HAL Id: hal-00276352, Apr. 29, 2008.
Tanskanen et al., "Model Optical Transmitters With a Circuit Simulator", Microwaves & RF, vol. 44, No. 4, Apr. 2005.

\* cited by examiner

Theoretical Cancellation vs. Precision Requirements

| Requirement | Performance |
|---|---|
| Operating range | Various |
| RF Cancellation (Primary) | 35dB |
| Input Power | 10 mV |
| EMI | Commercial grade |
| Weight | .2 lbs |
| Size | .2" x .5" x .5" |
| Environmental | Commercial grade | ly
SYSTEMS APPROACH TO INTERFERENCE CANCELLATION

CROSS-REFERENCE TO RELATED APPLICATIONS

The present application claims the benefit of the filing date of U.S. Provisional Patent Application Ser. No. 61/198,336 (Suarez et al.) filed on Nov. 5, 2008 and U.S. Provisional Patent Application Ser. No. 61/488,521 filed on May 20, 2011, which are incorporated herein by reference as if set forth in full below.

This application is a continuation-in-part of and claims priority to U.S. Nonprovisional application Ser. No. 12/613,512, filed on Nov. 5, 2009, and U.S. Nonprovisional patent application Ser. No. 13/399,327, filed on Feb. 17, 2012, which are incorporated herein by reference as if set forth in full below.

STATEMENT REGARDING FEDERALLY SPONSORED RESEARCH OR DEVELOPMENT

This invention was made with government support under Prime Contract W911NF-07-D-000I (Subcontract TCN: 08-004) awarded by the Department of the Army. This invention was also made with government support under Subaward #96183NBS68 from Booz Allen Hamilton, Inc. to Princeton University (PRIME: U.S. Army, Grant # W15P7T-06-D-E401) and Subaward #S12-119176 from CACI Technology, Inc. to Princeton University (PRIME: U.S. Army—Fort Monmouth, Grant #TESS W15P7T-09-D-P013). The government has certain rights in the invention.

BACKGROUND OF THE INVENTION

I. Field

The present invention relates to systems and methods for interference cancellation, and, more specifically, the use of optical techniques in systems and methods for interference cancellation.

II. Background

Radio-frequency (RF) and microwave signals are commonly employed in wireless communications due to their desirable propagation characteristics. To minimize losses and distortion, systems often transmit the signals at higher power levels to minimize the losses and distortion that may result. At the receiving end, the signals are inevitably received at power levels significantly lower than the power levels used for transmission. If a transmitter and receiver are co-located, this can cause significant difficulties because the transmitted signal can interfere with the desired received signal and in some cases may overpower the received signal such that it is buried under the locally transmitted signal. In addition to interference generated by transmitters that are co-located with the receiver, other sources of interference at the receiver can include multi-path "echoes" originating from the co-located transmit signal where such multipath interference can be created from both static object (e.g., a building) and dynamic objects (e.g., a moving car), and can also include a remote interferer (such as a jammer). Moreover, in the case of the remote interference, no prior knowledge of the interference is assumed.

A variety of electronic methods for interference cancellation have been developed and currently are in use. For example, U.S. Pat. No. 6,724,840 entitled "Adaptive Interference Cancellation Method" discusses 'the design and performance of an analog cancellation system. The system generates either narrow or wideband nulls in order to minimize the effect of interfering signals on a receiver. A microcontroller directs the detection and classification of the interfering signal relative to frequency, amplitude and modulation, such as pulse-width or continuous wave modulation. A sampled version of the interfering signal at frequency, fi, is phase-inverted, amplified, and vector-summed with the input signal stream to null the interfering signal at fi. The microcontroller also monitors and adjusts the cancellation system's circuit parameters to minimize any residual interfering signal at fi or respond to changes in the interference. In another example, U.S. Pat. No. 7,366,244 discloses a cancellation device that attempts to suppress antenna interference by generating an estimate of the interference signal and subtracting the estimate from the interference signal. The cancellation device can generate the estimate based on sampling signals on an antenna that generates the interference or on an antenna that receives the interference. The cancellation device can comprise a model of the crosstalk effect. Transmitting test signals on the communication system can define or refine the model.

SUMMARY OF THE INVENTION

In an exemplary embodiment, the present invention includes an interference cancellation system, comprising a receiver, capable of receiving a first signal; an interference estimation module, wherein said interference estimation module is configured to receive said first signal from said receiver, to estimate and to output an interference component of said first signal; and, an optical interference cancellation module in communication with said interference estimation module, wherein said optical interference cancellation module receives said first signal and said estimated interference component, and wherein said optical interference cancellation module is configured to optically cancel at least a portion of said estimated interference component from said first signal.

In another exemplary embodiment, the present invention includes a multi-unit interference cancellation system, comprising a first receiver capable of receiving a first incoming signal; a first transmitter, in close proximity to said first receiver, said first transmitter capable of transmitting a first outgoing signal; a second receiver capable of receiving a second incoming signal; a second transmitter, in close proximity to said second receiver, said second transmitter capable of transmitting a second outgoing signal; a first interference cancellation system comprising a first optical interference cancellation module, wherein said first incoming signal includes one or more of a portion of said second outgoing signal and an interference component attributable to the transmission of said first outgoing signal, and wherein said first optical interference cancellation module is configured to receive said first incoming signal and said first outgoing signal and to optically cancel from said first incoming signal at least a portion of said interference component attributable to the transmission of said first outgoing signal; and, a second interference cancellation system comprising a first electronic interference cancellation module, wherein said second incoming signal includes one or more of a portion of said first outgoing signal and an interference component attributable to the transmission of said second outgoing signal, and wherein said first electronic interference cancellation module is configured to receive said second incoming signal and said second outgoing signal and to electronically cancel from said second incoming signal at least a portion of said interference component attributable to the transmission of said second outgoing signal.

In another exemplary embodiment, the present invention includes an interference cancellation system comprising a first electro-optic modulator for receiving a first electrical signal; and a multipath component compensation system comprising an optical coupler and one or more branches connected to said coupler, each said branch comprising: (a) an arrayed waveguide grating weighting network; (b) an electro-optic modulator biased for parallel counter-phase modulation with said first electro-optic modulator; (c) at least one optical attenuator; and, (d) at least one optical delay; wherein said multipath component compensation system is configured to receive a second electrical signal combined with said first electrical signal, and to estimate multipath components of said second electrical signal; and, an optical coupler connected to said first electro-optic modulator and said multipath component compensation system.

In another exemplary embodiment, the present invention includes an interference cancellation system comprising a phased array of receiving antennas, each antenna capable of receiving a first signal; a transmitter, in close proximity to said phased array of receiving antennas, said transmitter capable of transmitting a second signal; an optical interference cancellation module, wherein said optical interference cancellation module is configured to receive said first signal and said second signal, and to optically cancel from said first signal at least a portion of an interference component attributable to the transmission of said second signal; a beam steering module, wherein said beam steering module is configured to receive said first signal, to calculate an angle of arrival of said first signal at said phased array, and to remove any signal components included in said first signal that arrived at said phased array from an angle of arrival associated with one or more sources of interference; and, an adaptive processing module, wherein said adaptive processing module is configured to receive said first signal, to estimate said first signal in the presence of co-located and remotely located interference, and to remove said co-located and remotely located interference from said first signal.

In another exemplary embodiment, the present invention includes a method of cancelling interference, comprising: receiving first signal at a receiver; estimating an interference component of said first signal using an interference estimation module; and optically cancelling said interference component of said first signal using an optical interference cancellation system.

Still other aspects, features, and advantages of the present invention are readily apparent from the following detailed description, simply by illustrating exemplary embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a further understanding of the nature and objects of the present invention, and there advantages thereof, reference should be had to the following description taken in conjunction with the accompanying drawings in which like parts are given like reference numerals and, wherein.

DETAILED DESCRIPTION

The present invention employs a systems approach to radio frequency (RF) interference cancellation that employs wideband remote interference cancellation using optical processing as well as digital and electronic cancellation methods. Interference is one of the key limitations of RF equipment. Removing interference is a very challenging problem because it can be generated from multiple sources with characteristics that change rapidly and in unpredictable ways. Whereas traditional approaches based on channel spacing and filtering are robust, they result in an inefficient use of the RF spectrum. Additionally, with traditional approaches, unexpected interference such as multi-path interference and remote interference can result in abrupt disruption of the communication link.

Figure 1:
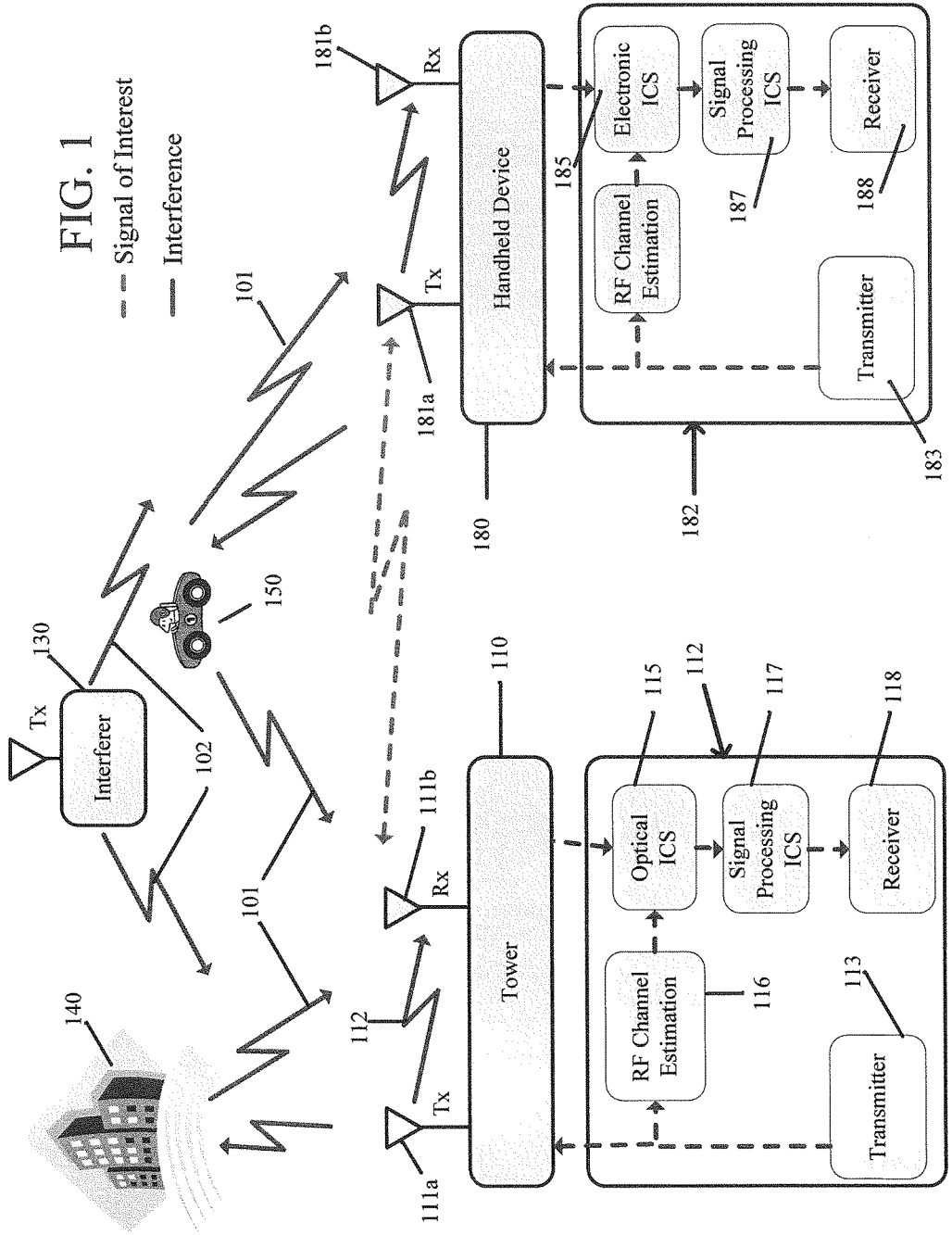
FIG. 1 is a conceptual diagram illustrating the various forms of interference which may hinder communications between two devices, and further illustrating a cancellation system for addressing said sources of interference.

In the scenario shown in FIG. 1, a tower 110 and handheld device 180 are attempting to communicate with each other over a large distance. There are several sources of interference, including: transmissions from transmitter antennas 111a and 181a that are co-located with the tower receiver 111b and handheld receiver 181b, respectively; multi-path interference 101 created by reflections of the transmissions from the co-located transmitter antennas 111a and 181a; and remote interferer 130. The multi-path interference can be created by, for example, buildings 140 (static object) and cars 150 (dynamic object). Notably, in the case of remote interferer 130, no prior knowledge of the interference is assumed.

Also shown in FIG. 1 is an interference cancellation system (ICS) located at both the handheld device 180 and the tower 110. The tower ICS 112 depicted in FIG. 1 comprises an optical ICS 115 (described in more detail below) which receives as inputs the raw signal received by tower receiver antenna 111b and the output of RF channel estimator 116 (described in more detail below). The RF channel estimator 116 takes as an input a sample of the signal sent to transmitter antenna 111a from transmitter 113. The output of optical ICS 115 is then further processed by signal processing ICS 117, with the output of signal processing ICS 117 finally reaching receiver 118. The tower ICS 112, its component parts and its functionality are described in more detail below.

Also shown in FIG. 1 is the handheld ICS 182, which in an embodiment comprises an electronic ICS 185 (described in more detail below) which receives as inputs the raw signal received by handheld receiver antenna 181b and the output of RF channel estimator 186 (described in more detail below). The RF channel estimator 186 takes as an input a sample of the signal sent to transmitter antenna 181a from transmitter 183. The output of electronic ICS 185 is then further processed by signal processing ICS 187, with the output of signal processing ICS 187 finally reaching receiver 188. The handheld ICS 182, its component parts and its functionality are described in more detail below.

A. Optical ICS

Figure 2:
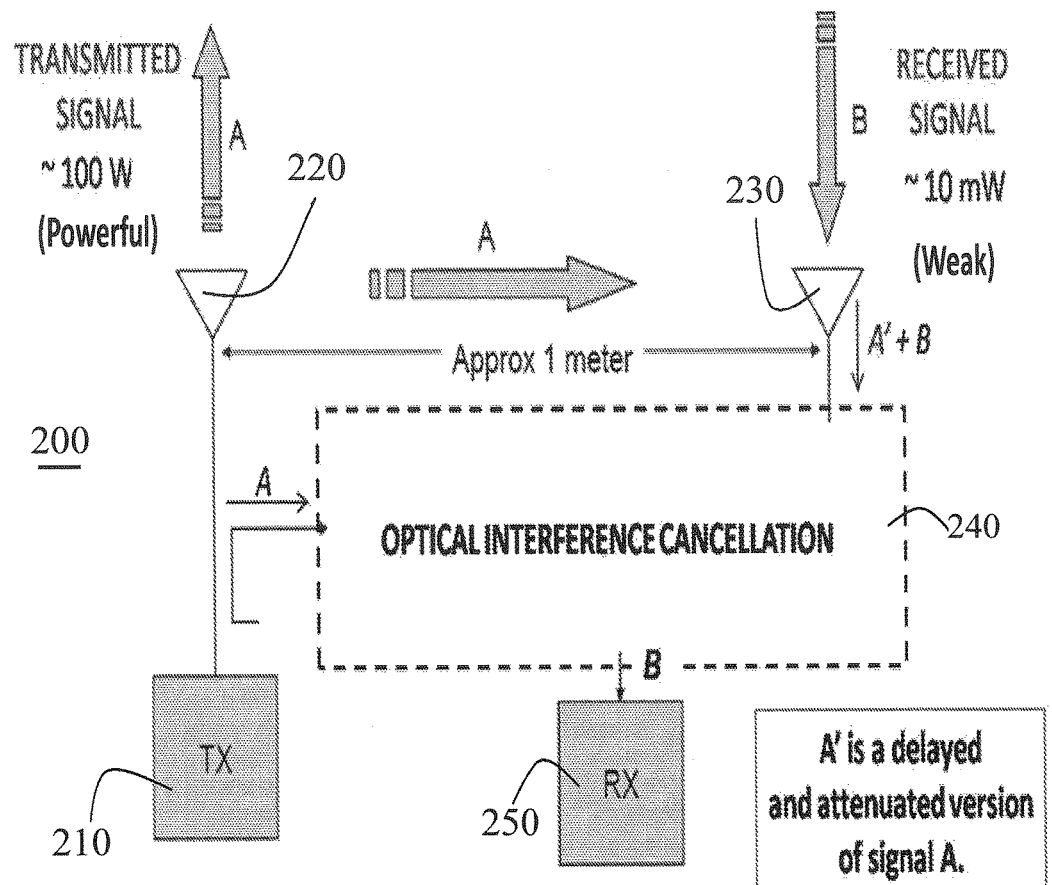
FIG. 2 is a block diagram illustrating the optical interference cancellation problem to which an exemplary embodiment of the present invention is directed.

The present invention employs new systems and methods of optical processing to address problems associated with interfering signals. The general problem is described with reference to system 200 shown in FIG. 2. A transmitting antenna 220, which is connected to a transmitter 210, and receiving antenna 230 are separated by approximately 1 m. The transmitting antenna 220 emits RF radiation whose power is of the order of 100 W, while the power of the received signal (measured at the input of the receiving antenna 230) is of the order of 1 W. The received signal is comprised of both a desired signal and a delayed-and-attenuated replica of the transmitted signal. From the standpoint of the receiver 250, one may consider the transmitted signal to be additive noise which undesirably combines with the desired signal.

To address this problem, a preferred embodiment of the present invention is an optical interference cancellation system 240 and method that accepts a received signal and the transmitted signal as separate inputs, converts both of these inputs to optical signals, inverts the transmitted signal, and combines (adds) the two signals. This effectively cancels the transmitted signal, yielding only the desired component of the received signal as output. Conversion of this optical output to an electrical signal is performed by means of a lightwave converter module.

The present invention uses optical methods to perform signal cancellation to produce extremely accurate channel tracking between any two parallel components in the system and to obtain precise time delays. See A. Sonnenschein and W. K. Hutchinson, "A Design for an Electro-Optic Implementation of a Wideband Nulling System," MIT Lincoln Lab. Tech. Rep. 887, 1990; B. Ortega, D. Pastor, J. Mora, J. Capmany and M. Andre's, "Advanced optical processing of microwave signals," EURASIP J. Appl. Signal Process., vol. 10, pp. 1462-1484 (2005); and J. Capmany, D. Pastor, B. Ortega, J. Mora and M. Andre's, "Photonic processing of microwave signals," IEEE Proc. Optoelectron., vol. 152, no. 6, pp. 299-320 (December 2005).

For perfect cancellation, a signal must be split into two replicas that are precisely equal. One of these replicas is inverted and then combined with the non-inverted replica. The depth of cancellation depends on the equality of the two replicas. However, when an optical carrier is modulated by an RF signal, the fractional bandwidth is small; and accurate channel tracking can be achieved. In this way, equality between the two signal replicas can be more closely realized that it can be with current state-of-the-art electrical components.

A precise time-delay mechanism also is necessary for a perfect solution to the signal-cancellation problem, since ultimately the two signal replicas must be accurately "aligned" in time so that peaks and troughs cancel precisely.

It is important to reiterate that for a perfect solution the only difference between the two signal replicas must be an exact inversion-they must be identical in every other respect, and that equality must be maintained prior to the addition of the signals. Accurate channel tracking can be obtained in two different ways: (1) preserving the integrity of the RF signal, or (2) degrading the RF signal in equal amounts. These are the only ways one can ensure that identical signals emerge from the two channels. Since all devices present some type of degradation to a signal-which may be in the form of attenuation, the addition of noise, and/or the addition of spurious frequency components due to nonlinearities—the second option for channel tracking is used in a preferred embodiment. That is, the present invention achieves accurate channel tracking when the devices in one channel degrade the signal as much as the devices in the other channel. This requirement is met closely when: 1) the constituent devices in each channel are equal—where this equality holds true over the entire region of operation of the devices and 2) the optical components have small fractional bandwidths—the smaller the better. The system and method of the present invention performs such functions, capable of achieving desirable cancellation depth while simultaneously recovering a weak, desired signal. While prior electronic methods have provided cancellation of approximately 40 dB, examples of the present invention achieved cancellation exceeding 70 dB.

Figure 3:
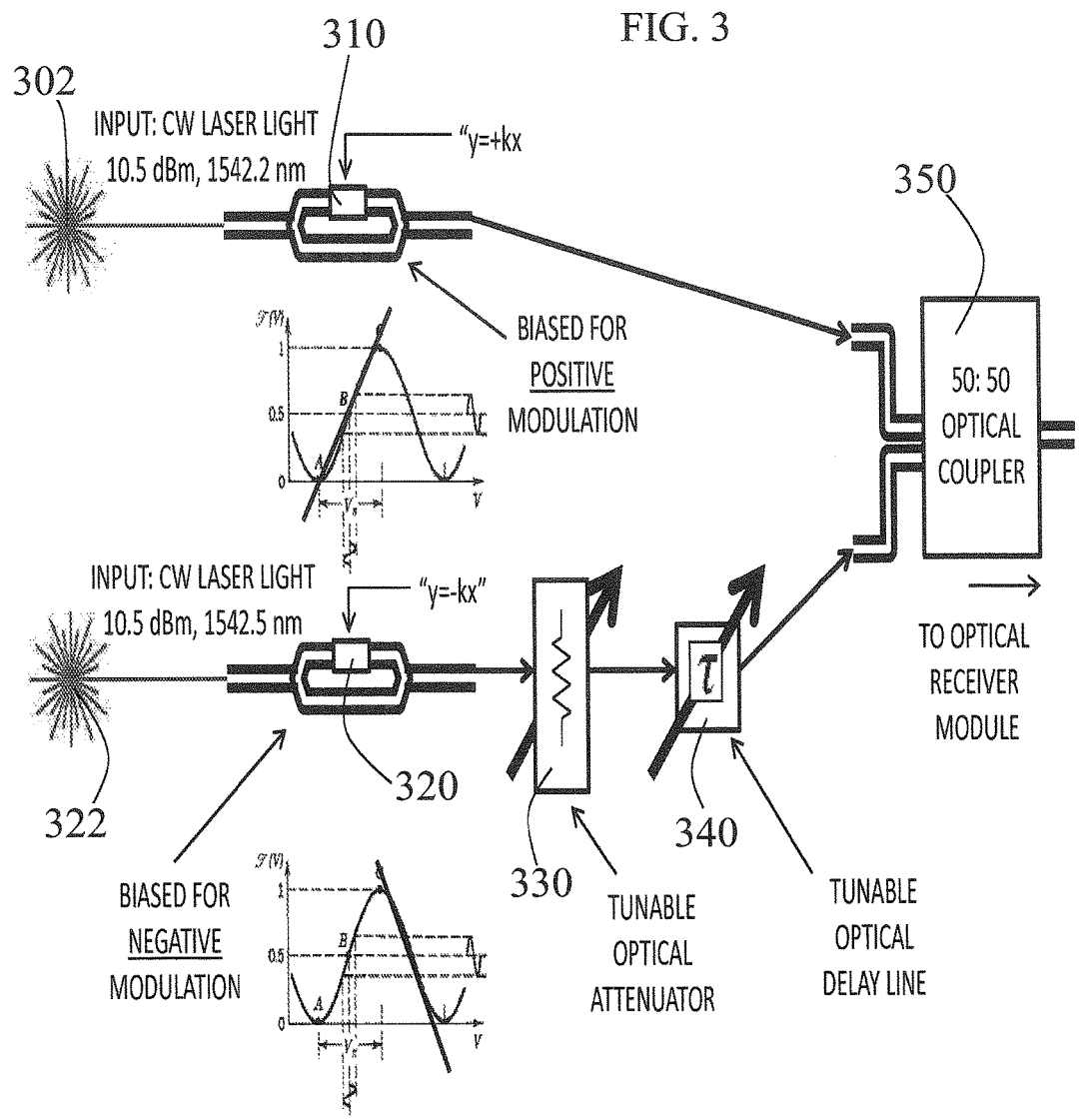
FIG. 3 is a block diagram illustrating basic principles of the operation of an exemplary embodiment of an optical cancellation system in accordance with the present invention.
Figure 4:
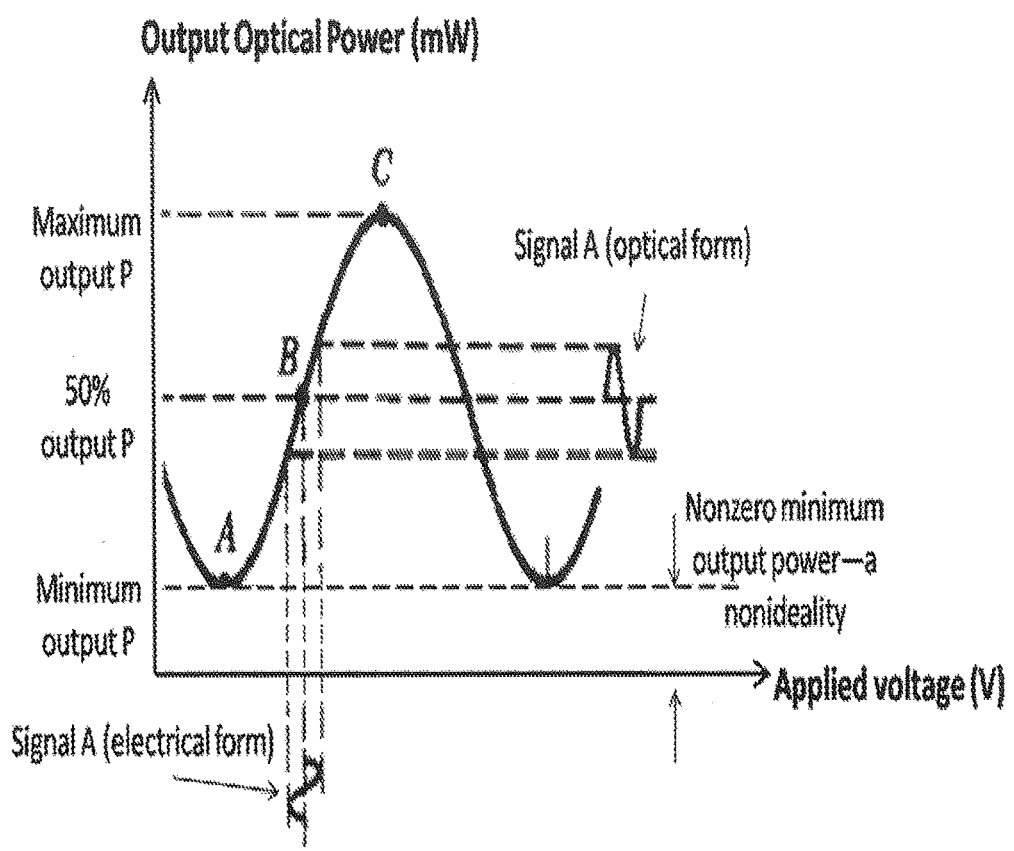
FIG. 4 is a graph illustrating transmittance characteristics of a Mach-Zehnder electro-optic modulator in an exemplary embodiment of the present invention.

The general principles of operation of the optical interference cancellation portion of the present invention are described with reference to FIG. 3. For purposes of description herein, the strong signal described above in the signal cancellation problem will be referred to as the "interfering signal" and the weak signal the system is attempting to receive will be referred to as the "desired signal." As shown in FIG. 3, the optical cancellation system utilizes two CW lasers 302, 322 providing a power of 10.5 dBm at wavelengths 1542.20 and 1542.50 nm, respectively. The lasers 302, 322 are isolated from each other, and serve as optical inputs to two Ti:LiNbO Mach-Zehnder electro-optic modulators 310, 320. It is well-understood that the transmittance curve of a Mach-Zehnder modulator follows a squared-cosine dependence, as shown in FIG. 3. The Mach-Zehnder modulator may be biased anywhere (within reasonable voltage limits) on its transmittance curve. As shown in FIG. 3, modulator 310 is biased such that its operating point lies in a region of increasing transmittance. Modulator 320 is biased such that its operating point lies in a region of decreasing transmittance. These two cases may be referred to as "positive quadrature modulation and negative quadrature modulation," respectively. Collectively, this biasing arrangement may be referred to as "parallel counter-phase modulation." The output of the modulator 320 is connected to a tunable optical attenuator 330 and a tunable optical delay line 340. The output of the tunable optical delay line 340 and the output of modulator 310 are connected to a 50:50 optical coupler 350.

Figure 28:
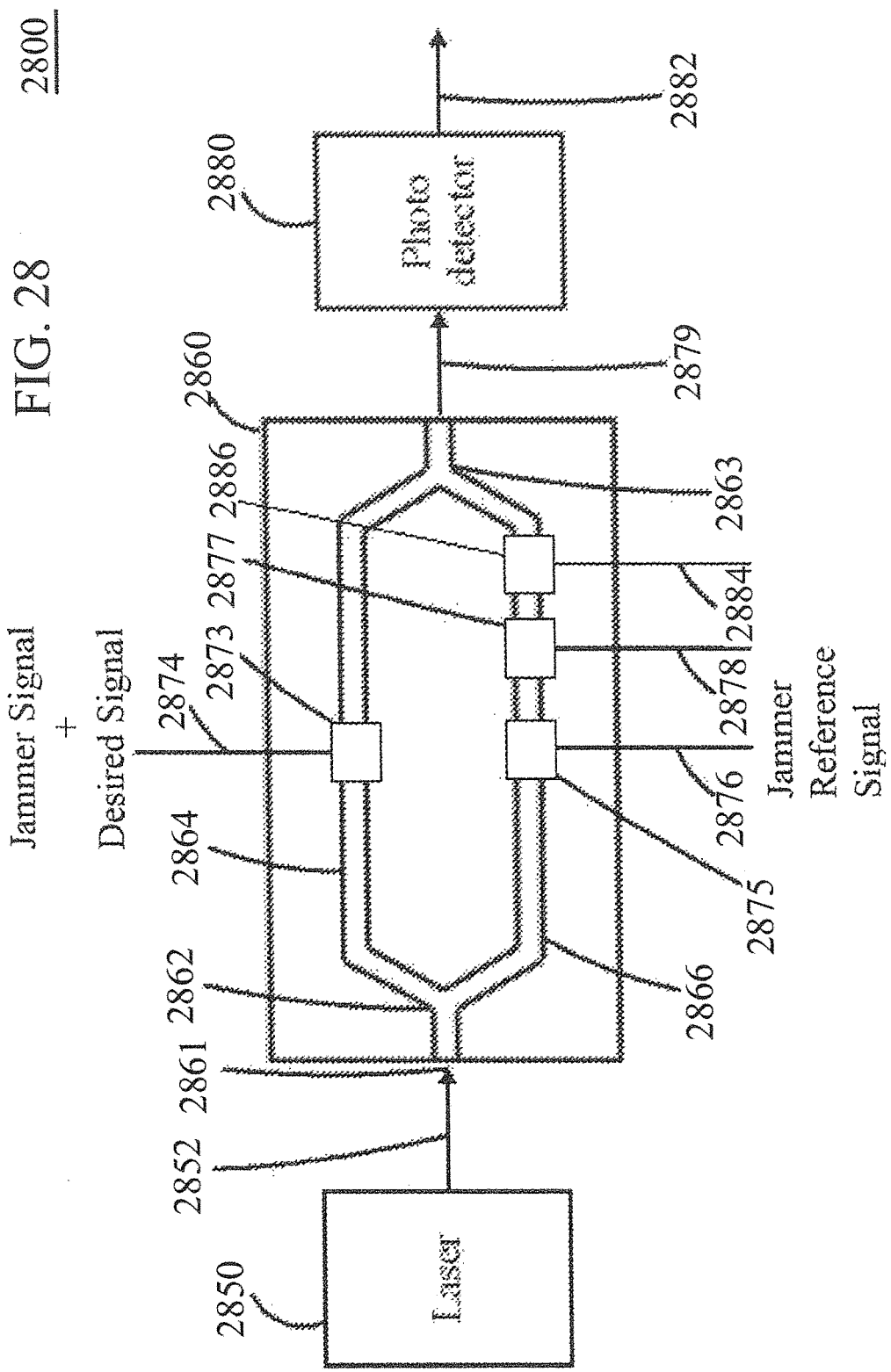
FIG. 28 is a block diagram of an alternative embodiment of an optical ICS of the present invention.

In an alternative embodiment, the optical ICS may be implemented using a dual parallel electrical RF to optical converter (for example, a Dual Parallel Mach-Zehnder modulator (DPMZ)) configured for a "Coherent Optical" cancellation approach as shown in FIG. 28. The advantages of the DPMZ in this configuration are improved RF amplitude and phase tracking, minimal DC offset, and reduced distortion as compared with systems using two nearly identical Mach-Zehnder modulators on the same chip. It should be understood that other converters may be used to implement an interference canceller based on the disclosure herein (for example, a Dual Drive Mach-Zehnder (DDMZ)). In the embodiment depicted in FIG. 28, interference cancellation system includes a laser light source (laser) 2850 having an output 2852 coupled to input 2861 of DPMZ 2860. The output 2879 of the DPMZ 2860 is coupled to a photo detector 2880. The output 2882 of the photo detector 2880 may then be coupled to a radio antenna input. It should be understood that various filtering and/or amplitude adjustments may be implemented in the various optical links between lasert 2850, DPMZ 2860 and the antenna input.

The DPMZ 2860 can be implemented using a crystal, such as lithium niobate, whose refractive index varies as a function of the strength of the local electric field. Suitable converter units may be obtained from various manufacturers including JDS UNIPHASE Corp. (wwwjdsu.com) of Milpitas, Calif., COVEGA TECHNOLOGY (now THORLABS—www.thorlabs.com) and FUJITSU (www.fujitsu.com) of Tokyo, Japan. The DPMZ 2860 includes an input 2861 and an output 2879. The DPMZ includes a splitter 2862 feeding a first arm 2864 and a second arm 2866. The first and second arms 2864, 2866 terminate at combiner 2863. The first and second arms 2864, 2866 include first and second electrodes 2873, 2875 coupled to input terminals 2874, 2876 respectively. Input terminals 2874, 2876 are used to vary the electric field, and therefore the refractive index, of the first and second arms 2864, 2866 respectively. For matters of simplicity, ground terminals are not shown. Each arm 2864, 2866 functions as a linear phase modulator. The second arm 2866 also includes a phase compensator 2877 that is configured to shift the phase of the light traveling through the second arm by 180 degrees. The phase compensator 2877 may be externally adjustable via the phase compensator terminal 2878 (e.g., adjusted based on the laser frequency and other factors). In general, the received signal (i.e., the interferer combined with the desired signal) is coupled to the first terminal 2874, and the interferer signal is coupled to the second terminal 2876.

The second arm 2866 may also include an optical adaptive matched filter 2886 configured to supplement any adaptive electrical matched filtering performed on the RF signal before it is processed by optical cancellation system 2800. The optical adaptive matched filter 2886 may be externally adjustable via the optical adaptive matched filter compensator terminal 2884 (e.g., adjusted based on the laser frequency and feedback from external adaptive control elements, as well as other factors). The optical adaptive matched filter 2886 may be implemented with a series of optical weights and delays. The optical adaptive matched filter may be based on a photonic implementation of a finite impulse response (FIR) filter, which is a common and well-known filter used for signal processing. In conjunction with the RF matched filtering, the adaptive optical matched filter may aid in the cancellation of multipath reflections. The adaptive optical matched filter, along with a front-end RF matched filter, may compensate for the aggregate effect of multipath reflections by emulating the channel response of the environment. Such multipath compensation is achieved via a series of taps and delays, both in the RF filter as well as the optical filter. The optical matched filter achieves the weighting and delaying effects via arrays of variable optical attenuators and optical delay lines.

In operation, light from laser 2850 enters the DPMZ input 2861 and is split between arms 2864 and 2866. With two identical RF signal inputs coupled to terminals 2874, 2876, the DPMZ optically cancels the carrier, resulting in RF cancellation (zero light output). If a desired signal is present along with the interferer signal, the interferer signal is optically cancelled by the DPMZ and the desired signal with the interferer signal significantly reduced is output via DPMZ output 2879. The disclosed coherent optical approach generates minimal DC offset compared to non-coherent approaches, which cancel only the RF envelope but not all the light (carrier), leaving a residual DC offset at the photo detector output.

Figure 5:
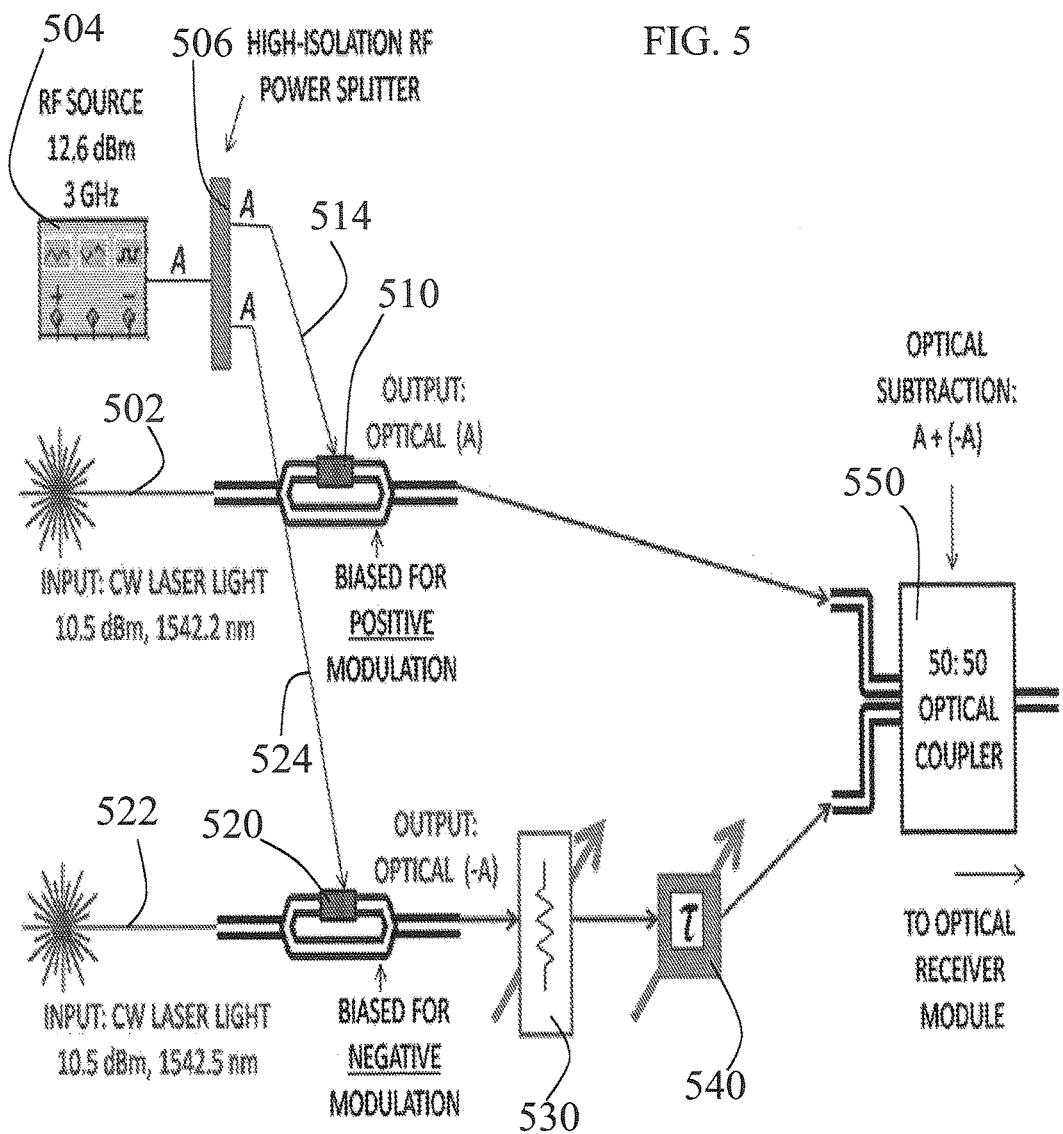
FIG. 5 is a block diagram illustrating an exemplary embodiment of the present invention performing cancellation of a simple sinusoid.

FIG. 5 shows a schematic of a first example demonstrating the optical interference cancellation system. In the first example, a signal generator 504 provides signal A to high resolution RF power splitter 506, which splits signal A into two approximately-equal "replicas." The replicas are used in place of actual antennas for purposes of demonstration. One of these replicas is sent as input 514 into the top Mach-Zehnder modulator 510 and undergoes positive modulation, while the other replica is sent as input 524 into the bottom Mach-Zehnder modulator 520 and undergoes negative modulation. Lasers 502, 522 are isolated from one another and serve as optical inputs to the modulators 510, 520. The outputs of both modulators ultimately are fed into a 50:50 optical-fiber combiner 550, whose output power varies as (A)+(−A)=O. This subtraction method may be referred to as incoherent optical subtraction. Note that the effective inversion of signal A results because the bottom Mach-Zehnder modulator 520 is biased to perform negative modulation. The setup also utilizes an optical attenuator 530 and an optical delay line 540, positioned before the 50:50 optical-fiber combiner 550, allowing the incoherent subtraction to be fine-tuned. This experimental setup demonstrates the invention's ability effectively cancel a simple sinusoidal signal.

The signal generator 504 first was set to a power level of 12.6 dBm and a frequency of 3 GHz. The output was observed with the bottom optical path disabled and then enabled. As used herein, "disabling the bottom optical path" refers to disabling the tunable optical attenuator 530 so that no light passes from the bottom optical modulator 420 to the optical fiber combiner 550. Effectively, this yields a maximum of power at the output of the system, since the output of the bottom modulator 520 (inverted signal A) does not subtract from the output of the top modulator 510 (non-inverted signal A). The maximum, at a peak at 3 GHz, had a value of 13.16 dBm. After noting the value of this maximum, the tunable optical attenuator 530 was then enabled, and the peak dropped significantly. However, the peak did not fall to the level of the noise floor. This was expected to be the case, since it is known that mismatches in the RF power splitter 506 and coaxial cables lead to unequal splitting of signal A. As a result, slightly different RF inputs are presented to the two electro-optic modulators 510, 520, leading to imperfect cancellation. The difference in the two RF inputs may be due to attenuation of one RF input signal that is uncompensated in the other RF input signal, or a time delay experienced by one RF input signal and not the other. To mitigate these effects, fine tuning in the optical domain is performed using the tunable optical attenuator 530 and tunable optical delay line 540. These two instruments were manually tuned until a minimum of power at 3 GHz was obtained. This minimum value was observed to be −86.16 dBm. "Optical cancellation" as used herein refers to the cancellation of signal A provided solely by the optical components of the system. To compute the optical cancellation, consider the aforementioned maximum value (−13.16 dBm) minus the minimum value (−86.16 dBm). The optical cancellation is the absolute value of this difference, which is 73 dB in the case of this example.

Figure 6:
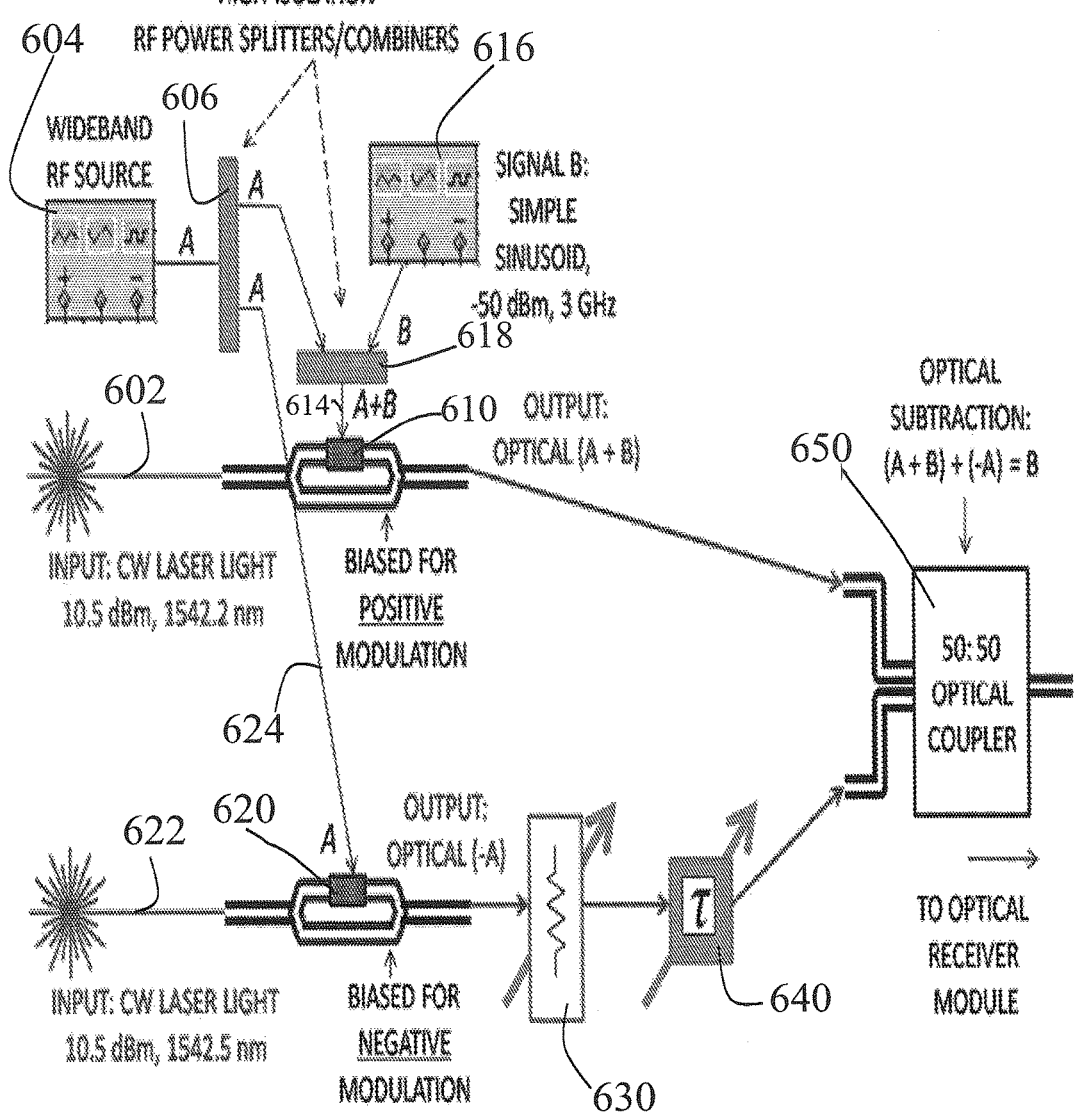
FIG. 6 is a block diagram illustrating an exemplary embodiment of the present invention performing cancellation of a broadband interferer.

In the second example, a second signal generator 616 is connected to the setup, as shown in FIG. 6. The purpose of the second signal generator 616 was to generate the weak, desired signal B that is to be recovered from the interfering signal A. As shown in FIG. 6, a high-isolation RF power combiner 618 was used to combine the output of signal generator 604 with that of signal generator 616, so that the net input 614 to the top electro-optic modulator 610 is the sum of signals A and B. Note that the input 624 to the bottom electro-optic modulator 620 remains unchanged. As in the prior example, the outputs of the eletro-optic modulators 610, 620 are connected to a 50:50 combiner 650. Lasers 602, 622 again are isolated from one another and serve as optical inputs to the modulators 610, 620. In this example, signal generator 604 was adjusted to generate a wide-band (96-MHz), additive-white Gaussian-noise (A WGN) signal of 8-dBm power, centered at 3 GHz. Signal generator 616 was adjusted to generate a 15 dBm sinusoid at 3 GHz.

The system output first was observed when the bottom' optical path was been disabled. The wideband A WGN signal observed on the spectrum analyzer screen was the interfering signal A. Signal B could not be seen—it was effectively "buried" by the overpowering interference. The maximum value of signal A was seen to be −42.30 dBm. After noting these values, the bottom optical path was enabled again, and the optical attenuator 630 and delay 640 were adjusted as previously described. The minimum value was seen to be −75.78 dBm. The cancellation value is the absolute value of the difference: |(−75.78 dBm)−(−42.30 dBm)|=−33.48 dB across the 96-MHz bandwidth of the signal. The cancellation value is not as high as that for the sinusoidal case, but this is due to the lower value of the maximum power—the 8 dBm power level from the signal generator is spread over a 96-MHz bandwidth (as recorded on the spectrum analyzer, set to a 100-kHz resolution bandwidth).

Figure 7:
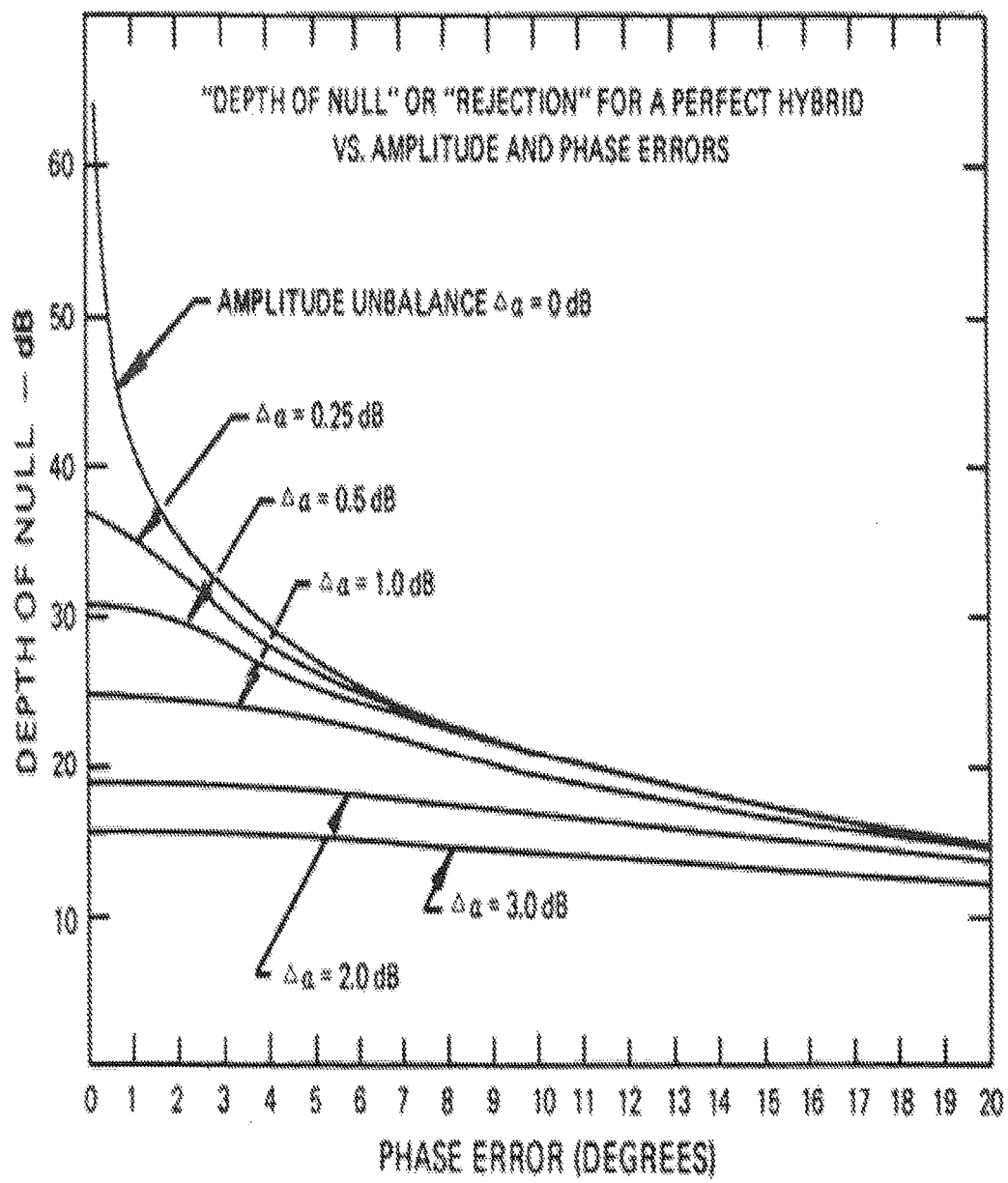
FIG. 7 is a graph illustrating depth of a null from the output of a hybrid coupler, plotted against amplitude and phase error.

The above examples have shown that the optical cancellation system and method of the present invention provides over 30 dB of cancellation over a bandwidth of 100 MHz. For sinusoidal signals, the system and method have provided cancellation over 70 dB, and have done so for sinusoids in the range of 50 MHz-6 GHz. For purposes of comparison, it may be beneficial to consider what would be required to reproduce this result using electronic methods. As an example, consider a microwave hybrid coupler. Suppose the two input ports of the coupler were loaded with an identically-split signal, with the purpose of obtaining a null at one of the output ports. This null is interpreted as cancellation of the input signal. For effective cancellation of a signal, it is imperative that the signal is split into two replicas that are precisely equal, except for an exact relative inversion between them. In practice, it is difficult to maintain these equalities. There will be an imbalance in the amplitudes and relative phase difference of the signals due to slight differences in the two propagation paths. These imbalances are referred to as amplitude error and phase error, respectively. FIG. 7 illustrates how the cancellation depth at the output of the hybrid coupler depends on the amplitude error and phase error between the two signals. Each curve corresponds to a constant value of amplitude imbalance dB, 0.25 dB, 0.5 dB, etc.). According to the figure, to achieve 30 dB of cancellation, for example, the amplitudes of the two signals must be balanced to within 0.5 dB and the relative phase difference cannot deviate (from 180 degrees) by more than 2 degrees. For cancellation of 60 dB, the requirements are even more stringent—the amplitude error must be 0 dB and the phase error must be less than half a degree. Such requirements can be met more readily with the optical cancellation system and method of the present invention, since optical attenuators provide reliable amplitude adjustment over a broad range of frequencies, and extremely precise phase shifts (time delays) are possible using optical delay lines. In fact, modern optical delay lines can provide time delays with femtosecond resolution. For example, consider 60 dB cancellation of a 3-GHz sinusoid. FIG. 6 shows that, in order to achieve this depth of cancellation, the phase error must be less than half a degree. At 3 GHz, using the speed of light in free space m/s, this corresponds to a time delay of 0.4633 ps. Such a time-delay resolution can be readily obtained with an optical delay line, as evidenced by the cancellation examples discussed above. However, the system and method only need to produce relatively short time delays with the optical cancellation method of the present invention. This is because the parallel counter-phase modulation technique provides the necessary relative inversion between the two RF signals, as they modulate their respective optical carrier waves. The optical delay line is in fact a corrective measure—it is a means of "correcting" any phase error that may have accumulated as the signals traverse their respective paths, both in the RF (coaxial) cables, and the optical fibers. And, this correction is accurate and stable across an extremely wide (terahertz) bandwidth.

As discussed above, the cancellation system and method of the present invention exhibits "accurate channel tracking" of the system. In a preferred embodiment, each optical propagation path (i.e., channel) in the optical cancellation system is comprised of a Mach-Zehnder electro-optic modulator and optical fiber. The two electro-optic modulators are biased for operation in their linear regions and appear as identical devices from the perspective of an impinging signal. This equality holds true over the entire linear regions of both electro-optic modulators. It can be shown that the half-wave voltage parameter can be used to characterize the linear region of a Mach-Zehnder electro-optic modulator. In essence, equal half-wave voltages mean equal linear regions. However, because it is difficult to fabricate Mach-Zehnder modulators with precisely equal half-wave voltages, the preferred embodiments of the invention may have a slight difference between the half-wave voltages of the two modulators. In a preferred embodiment of the invention, the half-wave voltages are 7 V for the top modulator and 6 V for the bottom modulator. With this I-V mismatch, it has been experimentally demonstrated that over 60 dB of signal cancellation is possible. From such results, one can conclude that matching of the half-wave voltages to within 1 V is sufficient to reduce the interfering signal to the level of the noise floor. The linearity of the two electro-optic modulators is important because a higher linearity lessens the appearance of spurious nonlinear components in the modulators' respective output signals. However, the attenuation provided by the modulators (in the form of insertion loses) is also an important factor. In addition, the noise presented by the system imposes a minimum-required input RF signal power for proper operation.

Figure 8:
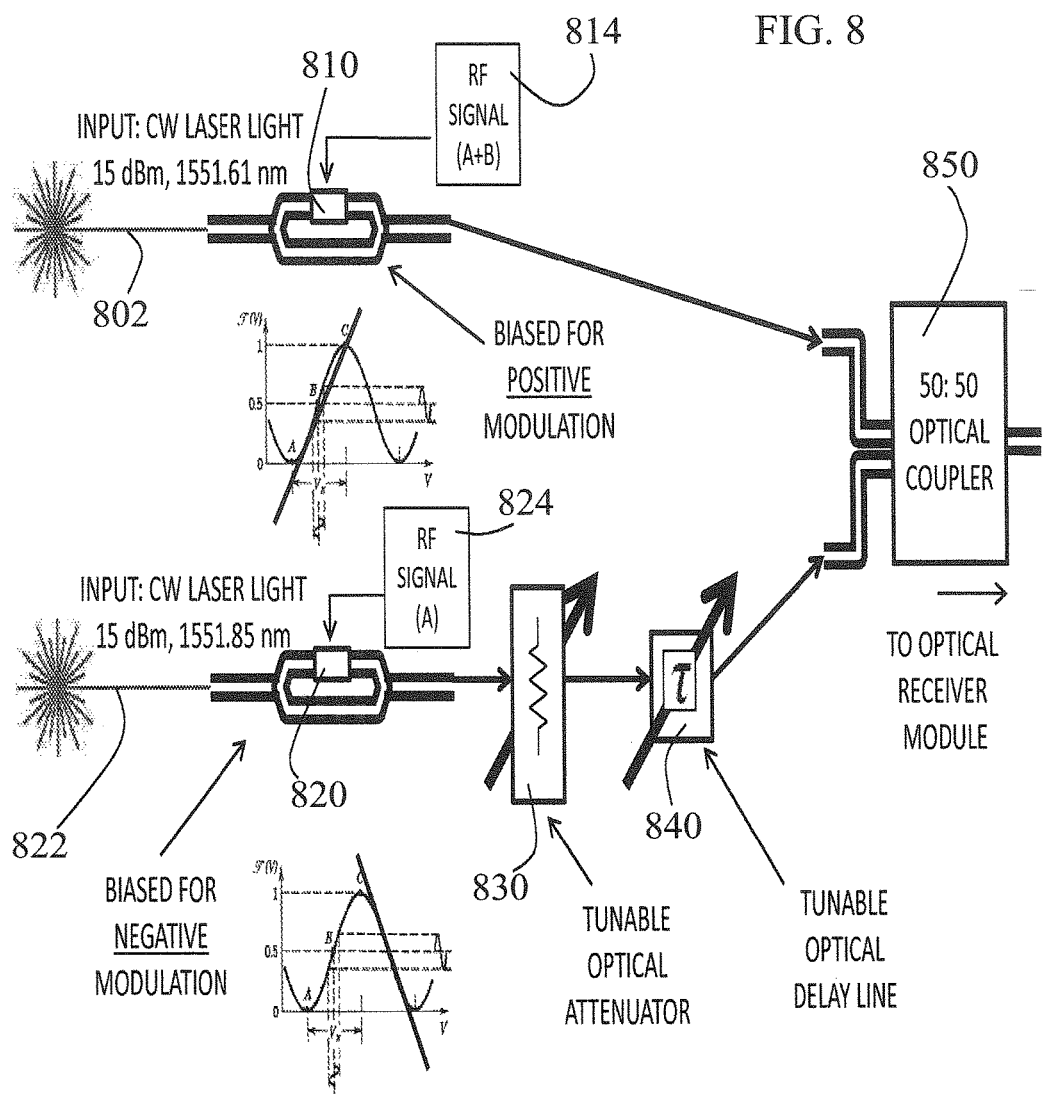
FIG. 8 is a block diagram illustrating an exemplary embodiment of a counter-phase optical cancellation system in accordance with the present invention.

FIG. 8 shows a conceptual schematic of another embodiment of a counter-phase optical interference-cancellation system in accordance with the present invention. The system has two CW (continuous-wave) lasers 802 and 822 providing a power of 15 dBm at wavelengths 1551.61 nm and 1551.85 nm, respectively. The lasers 802, 822 are isolated from each other, and serve as optical inputs to two Ti:LiNbO3 Mach-Zehnder electro-optic modulators 810, 820. Now, it is well-understood that the transmittance characteristic of a Mach-Zehnder electro-optic modulator follows a squared cosine dependence with respect to voltage. As in the examples discussed above, the Mach-Zehnder electro-optic modulators 810, 820 may be biased anywhere (within reasonable voltage limits) on its transmittance curve. In this embodiment, the top modulator 810 is biased such that its operating point lies in a region of increasing transmittance while the bottom modulator 820 is biased such that its operating point lies in a region of decreasing transmittance. Both of these bias points correspond to 50% transmittance. The technique is schematically represented, in general terms, in FIG. 8. It is important to realize that the RF signals are inverted relative to each other, immediately "upon arrival" into the system, by the counter-phase biasing of the electro-optic modulators 810, 820. The optical attenuator 830 and optical delay line 840 shown in FIG. 8 are for fine-tuning the cancellation. Unlike RF or microwave cancellation systems which are restricted in their operational bandwidth, the optical cancellation system of the present invention is potentially applicable over the entire RF and microwave frequency bands (10 kHz-100 GHz). The only components to be replaced, according to the operational frequency, are external to the optical cancellation system: these are the front-end and back-end, consisting of the RF preamplifier and RF post-amplifier, respectively. Still, the optical cancellation system's broadband character allows it to be applied independent of the RF front-end and back-end used for a particular application. That is, a separate integrated circuit technology would not be required for applications at 200 MHz, 1 GHz, and 20 GHz—the optical cancellation system would provide the same cancellation capability at each of these frequencies.

Figure 9:
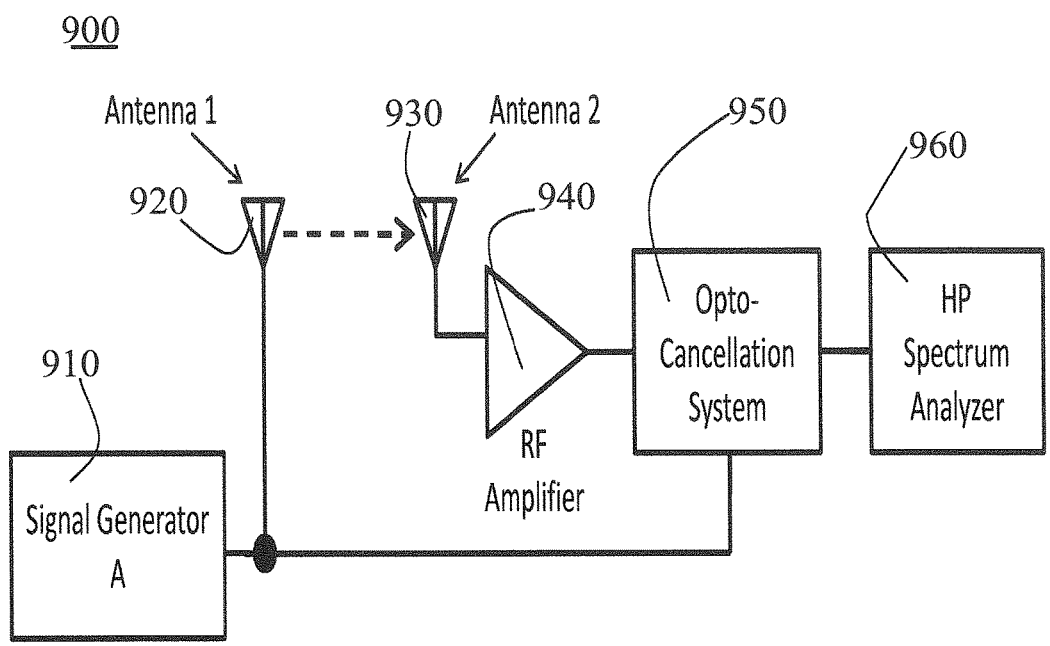
FIG. 9 is a diagram of an experimental setup used in an example showing optical cancellation in accordance with the present invention.

The performance of the optical cancellation system has been demonstrated in several examples, which were carried out using two basic types of signals over a wide range of frequencies. FIG. 9 shows the experimental setup 900 used in this set of examples. In all these examples, an Agilent E8267D 250 kHz-20 GHz PSG vector signal generator 910 was used to generate a "jamming," "interfering" or "offending" signal, which we will refer to as signal A. The output of signal generator 910 was split, using a resistive RF/MW power splitter (not shown), into two outputs. One of these was connected to the optical cancellation system 950 as an input. The other output of signal generator 910 was connected to an extendable-dipole antenna 920, so that signal A could be broadcast over the air. A receiving antenna 930 was connected through the RF amplifier 940 to the optical cancellation system's other RF input. Here, the system's performance was measured as the ability to reduce signal A, according to the formula $$\text{Cancellation depth} = |P_1(\text{in dBm}) - P_2(\text{in dBm})| \qquad (1)$$

where P1 is the maximum RF power level appearing on the HP spectrum analyzer 960 when the bottom optical path of the optical cancellation system (shown in FIG. 8) was disabled. To cancel signal A, the bottom optical path was enabled and the optical attenuation and optical delay were adjusted until a minimum of RF power was attained. P2 is this minimum power level, displayed on the HP spectrum analyzer. This can be visualized by referring to FIG. 8; but remember that signal B (in the top optical path) is not present. Referring to FIG. 8, notice that if the bottom optical path is disabled, then the received signal A passes to the output of the system unobstructed, effectively yielding a maximum power value of signal A. This is the maximum value P1 that is compared with the cancelled (minimum) value P2.

From the above example, it is apparent that the optical cancellation system and method of the present invention is capable of cancelling narrowband signals over a wide range of frequencies. Consider now whether this may be the best possible cancellation of a narrowband signal that can be achieved with the optical cancellation system. It is important to note that the value of cancellation depends not only on the minimum value of RF power given by P2 in Equation 1, but also the maximum value of RF power given by P1 in that same equation. To that end, a sinusoidal signal at 2.48 GHz was selected for this example. This value of frequency was chosen because the resonant frequency of the receiving antenna was 2.48 GHz, and therefore impedance mismatch-related losses would be minimized by using a signal at this resonant frequency. However, it was realized that an impedance mismatch would still be present between the antennas, since the resonant frequency of the transmitting antenna was between 88 MHz and 900 MHz. The power level of signal generator 810 was set to 16 dBm. This signal was broadcast over the air. A maximum power. value of −27.65 dBm was then noted on the HP spectrum analyzer 860. This maximum value of signal A, obtained by disabling the bottom optical path, illustrates the losses experienced by the signal due to the impedance mismatch between the antennas, over-the-air propagation losses, and system losses.

Cancellation of signal A was achieved by adjusting the optical attenuation and optical delay, until a minimum of power was obtained. This minimum was −110.18 dBm. With P1=−27.65 dBm and P2-110.18 dBm, the cancellation depth is 82.53 dB, according to Equation 1. Because of multipath propagation effects, there were fluctuations in these values (by as much as 6 dB) when there was movement around the experimental setup. To obtain these and all other power values, no movement around the experimental setup was permitted for approximately one minute prior to the recording of data. This allowed recordation of stable values of power from the HP spectrum analyzer.

While in the above-examples an optical attenuator and optical delay are shown only in the bottom path, the top path similarly may have an optical attenuator and/or optical delay to assist in fine-tuning the system. Similarly, the laser wavelengths used in the examples are merely exemplary, as different wavelengths—closer together or further apart—may be used with the present invention. Wavelengths further apart than those described in the examples may improve the performance of the invention. Further, lasers having the same wavelength could be used with the present invention.

B. Broadband Signal Cancellation

It is useful to determine whether the optical cancellation system can cancel a signal of finite bandwidth. For this example, an AWGN signal of 80-MHz bandwidth was employed. Initially, signal generator 910 was set to a produce an AWGN signal of 10 dBm power and 2.48 GHz center frequency. This signal was broadcast over the air, and a maximum of −67.50 dBm was noted on the HP spectrum analyzer. Cancellation was then achieved by adjusting the optical attenuation and optical delay, resulting in the minimum value of −95.48 dBm.

According to Equation 1, the system has provided cancellation of 27.98 dB; where this cancellation was approximately uniform over the entire 80-MHz bandwidth of the AWGN signal. Following this demonstration at 2.48 GHz, the center frequency of signal A was varied in discrete steps from 1 GHz to 20 GHz. The optical attenuation and optical delay were not changed-they were previously adjusted to obtain cancellation at 2.48 GHz (yielding the result shown in FIG. 7)—and were not touched again for the duration of the experiment. The center frequency of signal A was adjusted to the values 1 GHz, 2 GHz, 3 GHz, 5 GHz, 10 GHz, 15 GHz, and 20 GHz. The cancellation values, as calculated according to Equation 1, were 31.41 dB, 30.7 dB, 30.27 dB, 29.45 dB, 17.57 dB, 27.88 dB, and 16.7 dB, respectively. For the frequencies above 5 GHz, the power of signal generator 910 was increased to 23 dBm to overcome frequency-dependent losses external to the optical cancellation system (such as those due to the antennas). The cancellation as displayed on the HP spectrum analyzer at center frequencies of 5, 10, and 20 GHz were notably less than the 82.53 dB result.

In addition to providing deep cancellation levels, it is also desirable for the counter-phase optical cancellation system to recover a weakly received signal of interest. This weak signal must be recovered with a minimum of nonlinear distortion; and with a signal-to-noise ratio that is as high as possible.

The counter-phase optical-modulation technique requires optical fine-tuning; that is, the optical attenuation and optical delay must be precisely adjusted in order to achieve optimal cancellation. In the examples described above, these parameters were adjusted manually; using a trial-and-error approach. "Trial-and-error" refers to a method in which the radio-frequency output of the system was viewed on a spectrum analyzer, and the optical attenuation and optical delay were adjusted until the radio-frequency output was reduced to the noise floor.

A variety of systems and methods for automatically controlling that fine-tuning may be used in the present invention. Two exemplary embodiments incorporating systems and methods for automatic feedback control, both of which completely obviate the need for manual tuning of the optical attenuation and optical delay, are presented here. The first embodiment, which can be likened to a household climate-control-system controller, monitors the output radio-frequency signal power and adjusts the optical attenuation and delay until a minimum of radio-frequency signal power is obtained at the output. This method is referred to herein as the "dither" method. The second embodiment incorporating automatic control is referred herein as the "parameter offset" method. For a given optical attenuation setting and optical delay setting, this method immediately tells the user or system whether more or less optical attenuation and delay are required, so that a minimum of radio-frequency power is always obtained. Before discussing these two embodiments, a way of optimizing both control methods by "jumping" to near-optimal values of optical attenuation and delay is discussed.

1. Open-Loop Control for Expedited Cancellation

The optical cancellation system and method of the present invention was described above in the context of solving a basic, hypothetical problem of co-site interference mitigation, in which a weak RF signal, denoted B, must be received while a second stronger signal, denoted A, is being transmitted in close proximity. It was assumed that the power of the signal A was far greater (perhaps at least 10,000 times greater) than that of signal B. It was further assumed that the signal B may occupy the same band of frequencies as the signal A. Because the signal A is known, the rationale here is to split the strong signal A into two sub-signals, and feed one of these sub-signals into the optical cancellation system; the other sub-signal is provided as input to a transmitting antenna The opt-cancellation system then inverts and subtracts the subsignal (A) provided to it from the net received signal (A+B). As its name implies, the system performs this subtraction. The novelty of the counter-phase optical cancellation technique is that it immediately inverts one of the signals "upon entry" into the system. This inversion is realized by the negative-modulation bias on the bottom Mach-Zehnder electro-optic modulator, as discussed above. Once this inversion is performed, the variable optical attenuator and variable optical delay line serve to eliminate any remaining fluctuations or mismatches that would otherwise corrupt the subtraction/cancellation effect.

Figure 10:
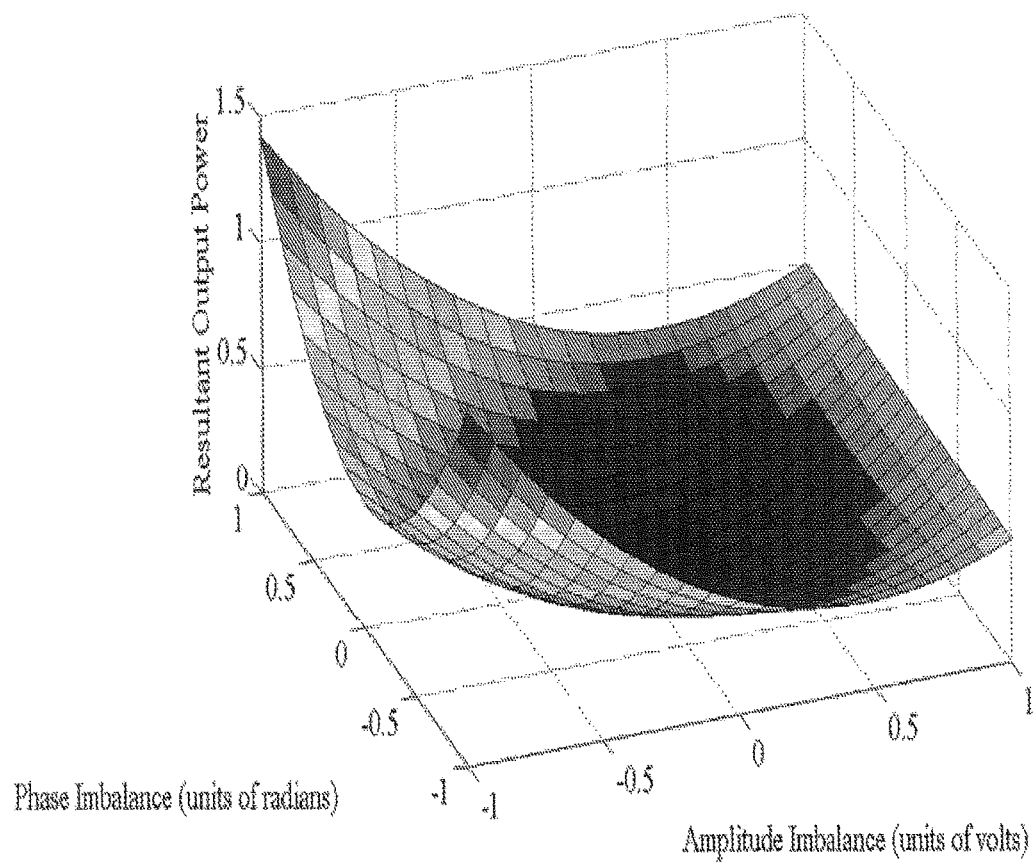
FIG. 10 is a graph of the average power $S1(t)-S2(t)$, a surface in the space of power versus amplitude imbalance and phase imbalance.

The variable optical attenuator and variable optical delay line may be manually adjusted; but it is beneficial to have automatic adjustment of these instruments. The optical cancellation system and method of the present invention has the ability to recover a weak radio-frequency signal in the presence of a more powerful, locally-generated interfering signal. This capability ranges over a wide frequency bandwidth. The cancellation operation can be generalized as a type of wideband analog subtraction. The radio-frequency signal denoted A may be expressed as two sub-signals $S1(t)$ and $S2(t)$. This is because signal A is split into two (ideally) identical signals before being sent as input into each of the Mach-Zehnder electro-optic modulators. As an example, suppose the signals are expressed as $S1(t)=(1-\alpha)\cos(2\pi ft+\phi)$ and $S2(t)=\cos(2\pi ft)$, where $\alpha$ represents an amplitude mismatch between the signals, and $\phi$ represents a phase difference or, equivalently, a time-delay mismatch between the signals. The goal is to subtract these two signals, yielding the difference $S1(t)-S2(t)=(1-\alpha)\cos(2\pi ft+\phi)-\cos(2\pi ft)$ and to minimize this difference. Ideally, the difference would be zero. In general, the difference $S1(t)-S2(t)$ is a function of the attenuation and delay between $S1(t)$ and $S2(t)$. It is a frequency-dependent function as well, but for purposes of simplicity, that dependence is not discussed here. FIG. 10 shows a plot of the average power corresponding to the difference $S1(t)-S2(t)$, given by $$1/T\int_0^T [S1(t)-S2(t)]^2 dt$$

$$=1/T\int_0^T [[(1-\alpha)\cos\phi-1]\cos(2\pi ft)-(1-\alpha)\sin\phi \sin(2\pi ft)]^2 dt$$

$$=\alpha^2/2+(1-\cos\phi)(1-\alpha) \quad (2)$$

The graph shows a surface in the space of power versus attenuation and delay. The automatic control attempts to apply the optical cancellation system so that the global minimum in FIG. 10 may be reached, or approached as closely as possible. The cancellation of signal A will be facilitated if one can ensure S1=S2=signal A; but this will not always be possible in practice. When signal A is split into two sub-signals S1 and S2, these two signals may traverse different paths before they enter the optical cancellation system. "Different paths," as used herein means propagation channels which present unequal amounts of attenuation and/or delay to each signal. If this is the case, then simple inversion will not be sufficient to guarantee optimal subtraction-some type of correction will also be required. This is the purpose of the variable optical attenuator and variable optical delay line, which are to be controlled automatically. A first step of an automatic control method is to estimate the error or, in this case, the initial amounts of mismatch in attenuation and delay between signals S1 and S2, and correct for these mismatches. These corrections were implemented by system 1100 shown in FIG. 11.

Figure 11:
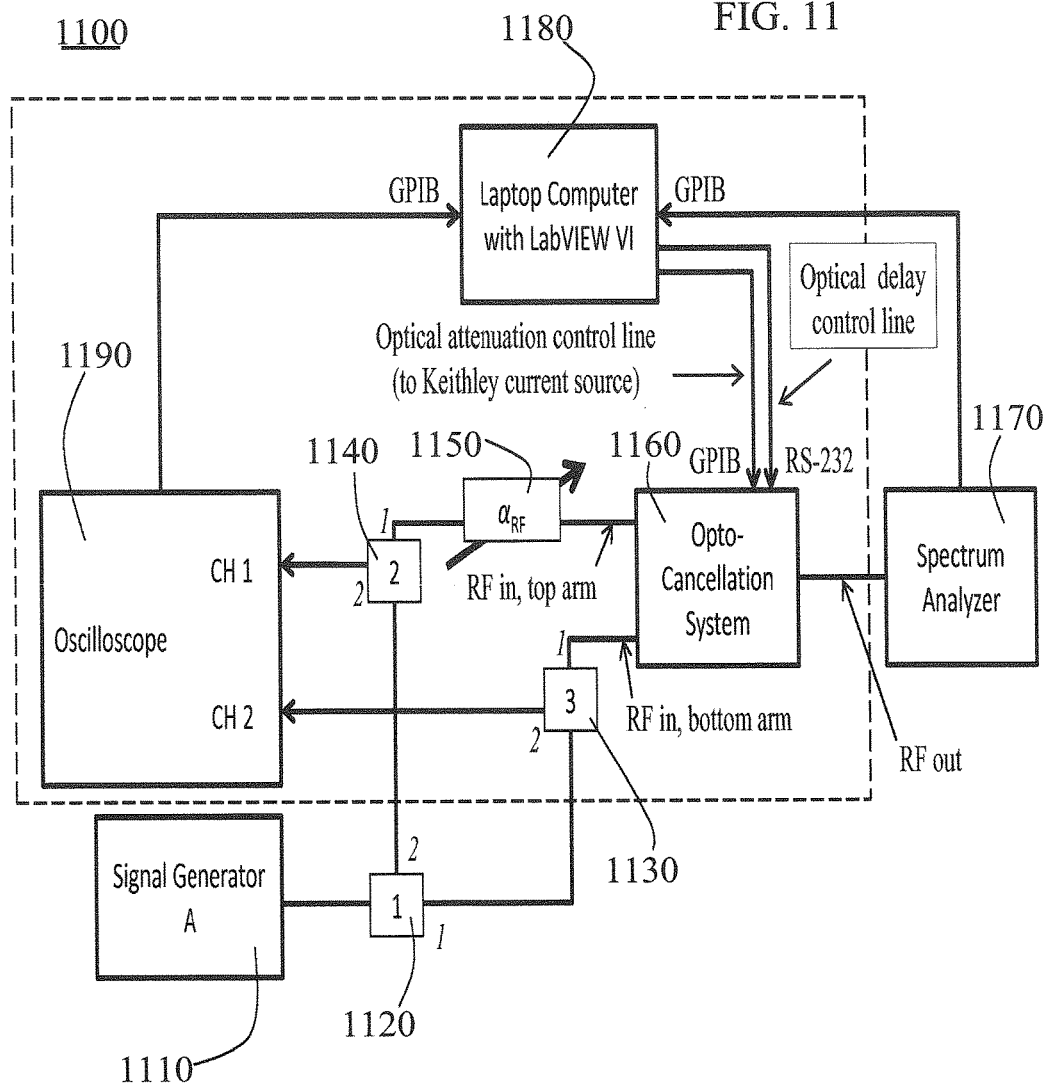
FIG. 11 is a block diagram illustrating open loop control in an exemplary embodiment of the present invention.

The system 1100 included several instruments external to the optical cancellation system 1160: a Tektronix TDS 3054B oscilloscope 1190, a laptop computer equipped with LabVIEW VI (a National Instruments software package specially designed for instrumentation) 1180, and a Keithley 2400 SourceMeter for controlling the optical cancellation system's variable optical attenuator. Internal to the optical cancellation system, and relevant to the open-loop control implementation, were the FDK YS-5010-155 current-controlled optical attenuator and the Newport F-MDL programmable motorized optical delay line. The oscilloscope 1190, laptop computer 1180, and SourceMeter were all connected on a general-purpose interface bus (GPIB) so that information could be exchanged among the various instruments via LabVIEW. The delay line was indirectly connected to the GPIB via an RS-232 interface. As shown in FIG. 11, the purpose of the oscilloscope 1190 was to first detect the amount of attenuation or delay imbalance between the two RF signals prior to their entry into the optical cancellation system. This imbalance was then "read" by a custom-programmed LabVIEW program (referred to as a virtual instrument, or VI). The LabVIEW VI then calculated values of electrical current (for the optical attenuator) and optical delay which were sent, via the GPIB bus and serial interface, to the Keithley SourceMeter and Newport optical delay line, respectively. The method by which the LabVIEW VI calculated the necessary electrical current for the optical attenuator will be described below.

The optical attenuator used in this embodiment of the optical cancellation system is a current controlled attenuator. For a precision application such as analog subtraction, it is helpful to know the exact amount of current that corresponds to a desired amount of attenuation. Similar comments apply to the optical delay line and required phase adjustments. For example, suppose the oscilloscope 1190 in FIG. 11 detects an amplitude imbalance of 0.75 dB between the two RF propagation paths. It is assumed that excess power is present in the bottom path of the optical cancellation (or "opto-cancellation") system 1160, since the generator 1110 providing signal A is directly connected to this bottom path.

Since 1 dB of attenuation in the RF domain corresponds to 2 dB of attenuation in the optical domain, it is evident that 2.75 dB of optical attenuation must be applied in order to correct for the 1.2 dB of amplitude imbalance measured at the input. It follows that the Keithley Source Meter must provide the proper amount of current to the optical attenuator, so that it will provide the necessary 2.75 dB of attenuation. Because attenuation vs. current information was not available for this particular optical attenuator, a characterization of the attenuator was performed. To that end, 9.43 dBm of optical power was provided as direct input to the optical attenuator using a CW laser source, and the output was connected to an optical power meter. Using the Keithley Source Meter, the current through the attenuator was adjusted to various values, and a table of current vs. attenuation was produced. However, it was recognized that this table provided a listing of the amount of attenuation provided for a given value of current. For automatic adjustment of the optical attenuation, it was understood that the necessary information was a tabulation- or formula-providing the required amount of current for a given attenuation value. This is because of the need to first detect the amount of amplitude imbalance, and then provide the necessary current to the optical attenuator which will correct that imbalance. To that end, a regression analysis was performed using a LabVIEW virtual instrument. As a result of this regression analysis, an eighth order polynomial was produced, which exhibited the best fit to the current vs. attenuation data This polynomial was programmed into a separate LabVIEW virtual instrument, and was used to implement the automatic attenuation adjustment described here. A similar regression analysis was not needed for controlling the optical delay line, because the required delay value was directly sent to the delay line-no value of current was needed.

Note that the purpose of the open-loop control is to first identify the amount of attenuation/delay imbalance that exists external to the optical cancellation system, and correct for it. This correction sought to make the difference S1−S2 as small as possible initially. Graphically, this corresponds to operation of the optical cancellation system at a point close to the global minimum on the surface shown in FIG. 10. Ideally, it is quite possible that the initial correction may permit the global minimum to be reached precisely. But, recall that system operation at the global minimum is the result of perfect correction for the imbalances which exist between the two RF propagation paths. Any condition which disrupts the state of the RF propagation paths after this correction has been made will void the benefits of that correction. Therefore, closed loop control will continually ensure that the cancellation remains optimized, even if the RF propagation paths change dynamically.

2. Dither Method of Closed-Loop Control

Figure 12:
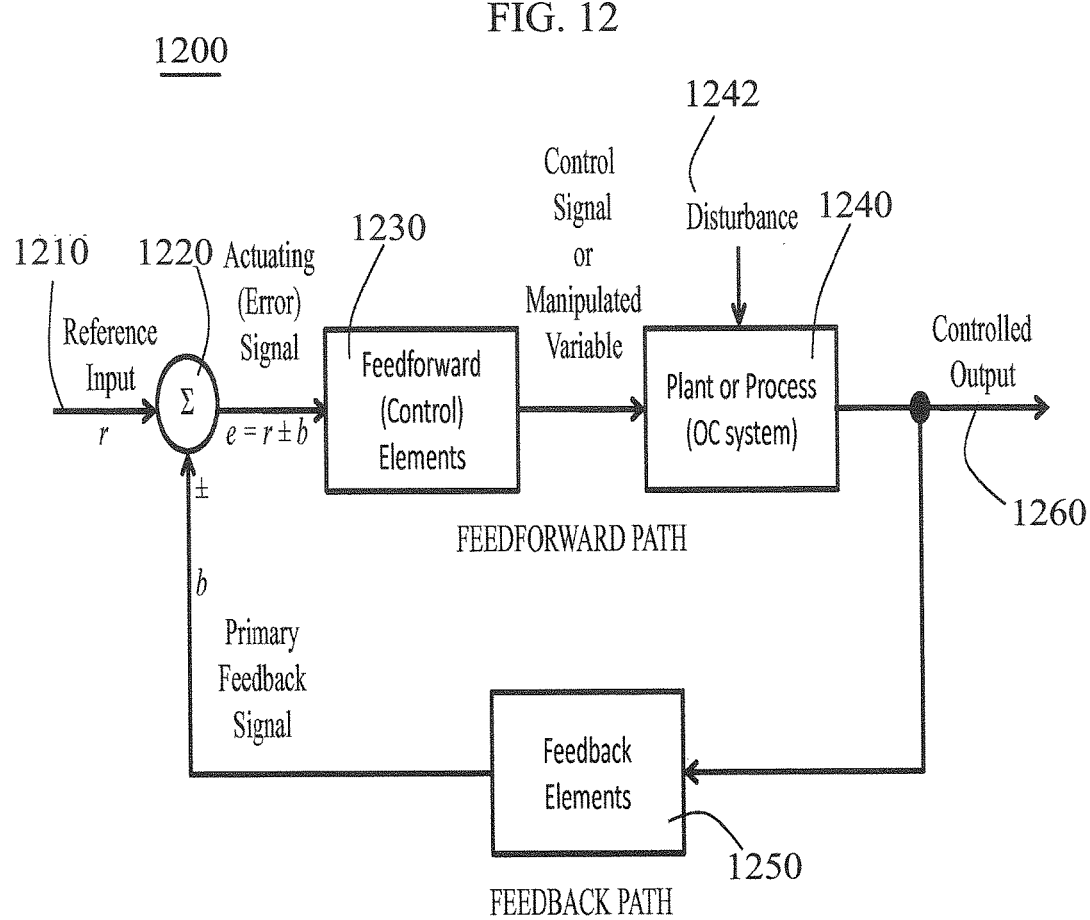
FIG. 12 is a block diagram of a feedback amplifier that may be used in an exemplary embodiment of the present invention.

FIG. 12 shows a general feedback amplifier configuration 1200. A reference input 1210 is inputted into a summer 1220 where it is summed with a primary feedback signal. An actuating error signal output from the summer 1220 is input into feed-forward control elements 1230 which output a control signal or manipulated variable to the plant or process (optical cancellation) system 1240, where a disturbance 1242 is introduced. The controlled output 1260 from the optical cancellation system is output but also is fed back to feedback elements 1250. In the previous section, the feed-forward path 1230 of this general feedback amplifier 1200 was addressed, involving initial correction for the error signal denoted e(t). The feedback path 1250 and how the error signal may be dynamically corrected is now addressed. One way of doing this involves simply monitoring the cancellation of signal A, by measuring the power of signal A at the output of the optical cancellation system If this power exceeds a certain user-defined threshold, the optical attenuation and optical delay are then readjusted until the power of signal A (at the output of the optical cancellation system) is reduced below that threshold. This method is appropriately called dithering because of the back-and-forth searching action by which the optical attenuation and delay are adjusted. These adjustments are continued until the power of signal A is reduced below the aforementioned threshold.

The setup of an example for realizing this method of control is illustrated in FIG. 11. Notice that the only addition to the open-loop control system is the spectrum analyzer 1170. A description of the role of each instrument in this open-loop control system will now be presented.

Signal Generator A.

The signal generator 1110 provided signal A to the optical cancellation system 1160. Signal A was split into two sub-signals using a resistive RF power splitter 1120 (splitter 1), and both of these sub-signals were presented as inputs to the optical cancellation system. However, prior to their entry into the optical cancellation system, each of these sub-signals was split once again using another resistive splitter 1140, 1130 (splitters 2 and 3). This enabled each subsignal to be sent not only to the optical cancellation system, but to the oscilloscope 1190 as well. Strictly speaking, signal generator A 1110 is not a part of the control loop. The two signals emerging from splitter 1 will be referred to as A-signals.

Oscilloscope.

This permitted acquisition of the amplitude and phase imbalance between the two A-signals which entered the optical cancellation system. Referring to FIG. 11, note that one of the outputs of resistive splitter 1140 was connected to channel 1 of the oscilloscope 1190; while one of the outputs of resistive splitter 1130 was connected to channel 2 of the oscilloscope 1190. The Tektronix oscilloscope 1190 used in this particular setup had an option which allowed the phase and amplitude parameters to be measured internally, and passed along the GPIB.

Current Source.

The purpose of the current source 1150 was to provide electrical current in precise amounts, for operating the optical attenuator inside the optical cancellation system. The Keithley Source Meter used in this setup received electrical current settings, typically in milliamperes, via the GPIB.

Programmable, Motorized Optical Delay Line.

Similar to the current source, the programmable optical delay line received commands, via the RS-232 interface, in the form of time-delay increments. These increments were typically in the picosecond range.

Spectrum Analyzer.

The purpose of the spectrum analyzer 1170 was to monitor the output power of the cancelled signal A at the output of the OC system. This power level was then sent, also via the GPIB, to the laptop computer. It can be seen that this instrument physically "closes the loop" in the feedback path.

Laptop Computer with LabVIEW Instrumentation Software.

Serving as the "brain" of the system, a LabVIEW VI was programmed and saved into a laptop computer 1180, and was running for the duration of all experiments performed in this section. The LabVIEW VI received data from the oscilloscope 1190, regarding the initial amplitude and phase mismatches, between the incoming A-signals. The LabVIEW VI also received data from the spectrum analyzer 1170, regarding the power level of the cancelled signal A at the output. According to these received data values, the LabVIEW VI calculated the necessary amount of electrical current and optical time-delay, in order to optimize the cancellation at the optical cancellation system's output. These calculated values were sent, via the GPIB and RS-232 interface, to the current source and optical delay line; respectively.

The method and computational details of the LabVIEW VI are now described in a step-by-step fashion:

1. User Inputs an Output-Power Threshold for the Anticipated Cancellation of Signal A.

This threshold, of course, will depend on the depth of cancellation that the optical cancellation system can provide. It will also depend on the noise floor of the spectrum analyzer. In order to minimize this noise floor, the spectrum analyzer was set to a span of 100 kHz and a resolution bandwidth of 51.1 Hz. These settings were feasible because only a narrowband signal was employed as signal A in these experiments. The reference level was set to −35 dBm.

2. Upon Running the VI, the Oscilloscope Measures the Amplitude and Phase Mismatches Between the A-Signals Upon their Entry into the Optical Cancellation System.

3. Correction for the Measured RF Amplitude and Delay Imbalances is then Applied by the Optical Attenuator and Delay Line.

For this step the attenuation-versus-current regression polynomial discussed above was utilized to ensure that the correct relationship between RF and optical attenuation was understood.

4. The Power of the Cancelled Signal A, at the Output of the Optical Cancellation System, is Displayed on the Spectrum Analyzer and Fed Back to the VI.

Ideally, this power level would be small because of successful cancellation by the optical cancellation system, but this was not always the case. Slight fluctuations disrupted the cancellation of signal A—this was made apparent by a rise in the power of signal A at the output.

5. Using the Output-Power Reading of Signal A, the VI Will then Readjust the Optical Attenuation and Delay in Small Increments, by Sending Parameter Values to the Appropriate Instruments.

This readjustment was performed continuously, similar to the manual dithering adjustment described above. This process continued until signal A was cancelled below the user-defined threshold, as measured on the spectrum analyzer. It is apparent that the initial error correction, described above, was particularly valuable here. The closer the initial error correction brought the output power to the global minimum, the less dithering was required.

In the event that the power of signal A increased above the user-defined threshold, the process would resume, beginning with step 3. Although this method is interesting (and reassuring) because it shows that a relatively straightforward instrumentation system can provide reliable and repeatable cancellation. The aforementioned LabVIEW VI was used to control the optical cancellation system with an input signal A of 5 dBm power and a frequency which ranged from 200 MHz to 1 GHz in 10-MHz increments. In each trial, signal A was cancelled down to the spectrum analyzer's noise floor of approximately −110 dBm, without the need for manual adjustment. The maximum value of signal A, measured at the output of the OC system on the spectrum analyzer prior to cancellation, was no higher than −38 dBm. After cancellation had been achieved, a variable RF attenuator-placed in the top RF input path—was manually adjusted in order to change the amplitude imbalance between the input A signals. The optical cancellation system automatically readjusted the optical attenuation and delay settings to obtain cancellation. It is evident that the simplicity of the optical cancellation system-specifically, its dependence on only two variables: optical attenuation and delay-lends itself to a conceptually simple method of automatic control.

3. Parameter-Offset Method of Closed-Loop Control

Figure 13:
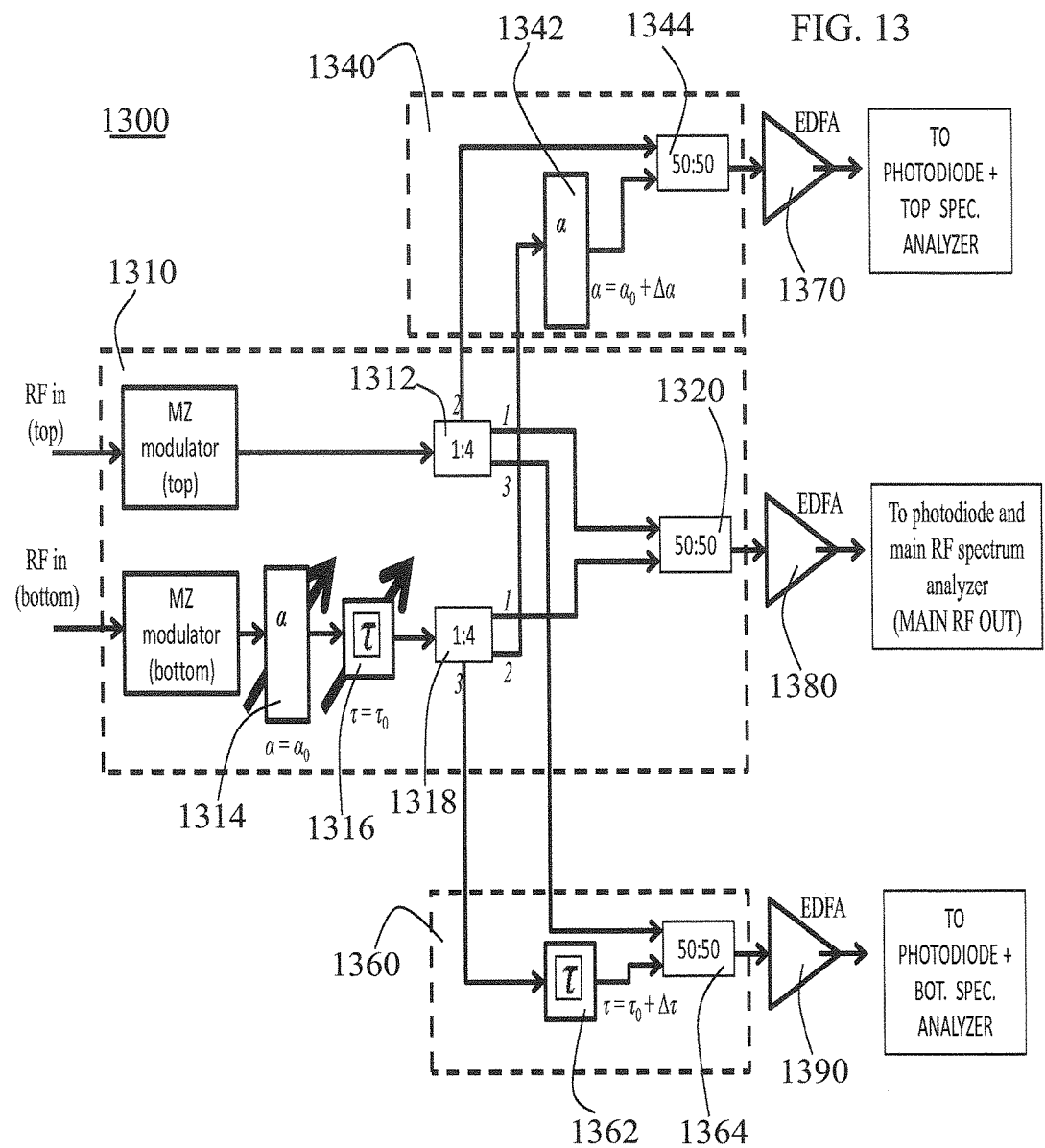
FIG. 13 is a block diagram illustrating a parameter-offset method of closed-loop control in an exemplary embodiment of the present invention.

The parameter-offset method may be best described by an example, and by referring to the graphical description shown in FIG. 13. The figure illustrates the hardware modifications required in order to implement the parameter-offset method. The reason for the name "parameter offset" will become clear shortly. Suppose again that signal A is a sinusoidal signal to be cancelled. Upon splitting this signal into the two A-signals (as described previously), one may anticipate there will be amplitude and delay mismatches requiring correction. This will be made apparent by the power level of signal A shown on the output of the spectrum analyzer-we expect it to not be cancelled; presumably at a maximum. Of course, the mismatches may be corrected by the initial error correction method described previously, but this may still be insufficient for optimal cancellation of signal A. In other words, the initial error correction has brought the output power of signal A close to the global minimum of the surface shown in FIG. 9—but not precisely at that point. Now, note that the ability to reach this global minimum entails application of the correct amount of optical attenuation and delay. If signal A's output power is not at this global minimum point, one may interpret the situation as the application of incorrect values of optical attenuation and delay. Consequently, a greater or lesser amount of optical attenuation will be required of the optical cancellation system; a similar statement applies for the optical delay. It would be beneficial to know if—for a given attenuation setting-more or less attenuation is required (and similarly for the delay). The parameter offset method provides this information immediately.

Referring to FIG. 13, there is a main pair 1310 and two secondary pairs 1340, 1360, referred to as the top secondary pair 1340 and bottom secondary pair 1360. The word "pair" is used because, in the original optical cancellation system, two RF photonic links are effectively connected in parallel; the two links constitute a pair. Each optical path, or link, is referred to as an arm. Recall that the original, unmodified optical cancellation system comprised an optical attenuator and optical delay line in its bottom arm. It can be seen that this original architecture is present in the main pair 1310 of the new architecture shown in FIG. 13. This will become apparent by following two paths in the figure: (1) Starting with the words "RF in, top", through the top arm of the main pair 1310, into the top 1:4 optical splitter 1312, out of the splitter through the path labeled "1", and toward the 50:50 combiner 1320. The output of the combiner 1320 goes through EDFA 1380 to a photodiode and the main RF spectrum analyzer. (2) Starting with the words "RF in, bottom", through the bottom arm of the main pair 1310, through the optical attenuator 1314 and delay line 1316, into the bottom 1:4 optical splitter 1318, out of the splitter through the path labeled "1", and toward the 50:50 combiner 1320. The words "MAIN RF OUT", enclosed by the solid box, designate the RF output of interest. As before, this is the RF output that would be passed to a radio receiver front-end in a practical system implementation. Returning to the cancellation scenario at the start of this section, suppose the optical attenuator 1314 in the main pair 1310 is currently providing $\alpha 0=1$ dB of optical attenuation; and the optical delay line 1316 in the main pair 1310 is providing $\tau 0=100$ ps of optical delay. These settings represent a first attempt to correct for RF amplitude and delay imbalances. Also suppose that the global minimum for the subtraction of the A-signals lies at the point Pmin(attenuation, delay)=(2 dB, 300 ps); but this is not known. Then, it can be stated that 1 dB more attenuation is required, and 200 ps more delay is required. The parameter offset method provides this information in the manner now described.

First, the output power corresponding to PI (attenuation, delay)=(1 dB, 100 ps) will appear on the main spectrum analyzer shown. Recall that this output corresponds to the RF output of interest. The output power corresponding to (1 dB, 100 ps) is considerably lower than the value obtained prior to the application of the optical attenuation and delay, but is still not minimal. Now, focus on the bottom arm of the bottom secondary pair 1360. For a given amount of delay provided by the delay line in the bottom arm of the main pair 1310, the delay line 1362 in the bottom arm of the bottom secondary pair 1360 will provide slightly more delay than that provided by the delay line in the main pair 1310. The output from the delay 1362 goes to the 50:50 combiner 1364 along with one of the outputs from splitter 1312. This can be seen in FIG. 13 by starting with the delay line 1316 in the main pair 1310, symbolized by $\tau=\tau 0$ (where $\tau 0=100$ ps in this example); and following the path denoted "3" through the bottom 1:4 optical power splitter 1318, down to the bottom arm of the bottom secondary pair 1360. Continuing along this path, notice that a variable optical delay line 1362 denoted $\tau=\tau 0+\Delta\tau$ is encountered. This notation indicates that this delay line provides slightly more delay than that of the main pair 1310. In our laboratory setup, this optical delay line was a General Photonics VDL-001-35-60 variable optical delay line, manually adjusted to provide $\Delta\tau=100$ ps. The output of the combiner 1364 goes through EDFA 1390 to a photodiode and the bottom spectrum analyzer.

Therefore, the bottom spectrum analyzer will show an RF output power of signal A corresponding to (attenuation, delay)=(1 dBm, 100 ps+100 ps)=(1 dB, 200 ps). This power level will be referred to as Pbottom. Now, focusing attention on the bottom arm of the top secondary pair 1340, it can be seen that the top spectrum analyzer will display an output power corresponding to (attenuation, delay)=($\alpha 0+\Delta\alpha$, $\tau 0$). In our laboratory setup, the variable optical attenuator 1342, labeled $\alpha 0+\Delta\alpha$, was set to provide $\Delta\alpha=1$ dB attenuation. The signal from the optical attenuator 1342 goes to the 50:50 combiner 1344 where it is combined with one of the signals from splitter 1312. It then is output from the combiner 1344 through EDF A 1370 to a photodiode and top spectrum analyzer. Therefore, the power level shown on the top spectrum analyzer will correspond to the point (attenuation, delay)=(2 dBm, 100 ps). This power level will be referred to as Ptop.

Recall that the global minimum of output power for signal A lies at the point Pmin(2 dB, 300 ps), but we are not aware of this. Because the top and bottom secondary pairs both provided values of attenuation and delay, respectively, which are closer to Pmin than the original P1 (1 dB, 100 ps) provided by the main pair 1310, the power values Ptop and Pbottom will be somewhat lower than P1. This is an indication that 1 dB more attenuation and 100 ps more delay are desirable—and therefore these amounts should be added to the attenuation and delay provided by the main pair. At this point, the reason for the name parameter offset should be apparent: the secondary pairs provide "foresight" into the cancellation that would be obtained if the attenuation and delay parameters are slightly offset from the values applied by the main pair. The advantage of this approach is that it provides immediate information as to whether more or less attenuation and more or less delay are required. Continuing with the example, it can be seen that repeated iterations will eventually allow the main pair to provide the values of attenuation and delay required for the global minimum of output power.

Comparisons Between the Methods

It can be seen that the parameter-offset method can rapidly yield the appropriate direction in which to travel, on the power-attenuation-delay surface, in order to reach the global minimum of power. Combined with an effective initial error correction routine, the parameter-offset method can be coupled with a suitable algorithm to adaptively and automatically yield optimal cancellation without the "randomness" of the dithering method. The initial error correction plays an important role in the ability of either technique to facilitate optimum cancellation. Such initial correction alleviates the burden to be solved by the closed-loop method that is ultimately used. It should be observed that the rapidity with which the parameter-offset method can obtain optimal cancellation does not come without cost. Note that three spectrum analyzers were required for the laboratory setup.

As also shown in FIG. 13, the bottom arm of the main pair must be duplicated to provide additional optical attenuation and delay-therefore requiring the top and bottom secondary pairs, respectively. In contrast, the experimental setup for the dithering method required only a single spectrum analyzer for feeding back the data. The trade-offs here are the simplicity of dithering vs. the complexity and cost of parameter offset on the one hand; but the efficiency and speed of parameter offset versus the latency of dithering.

Practical Considerations for Implementation

As described above, the notation $\alpha 0+\Delta\alpha$ is used in FIG. 10 to indicate that the bottom arm of the top secondary pair provides slightly more optical attenuation than the main pair. Likewise, the notation $\tau 0+\Delta\tau$ is used for similar reasons pertaining to the optical delay. To prevent overshooting or undershooting the global minimum, it is essential for $\Delta\alpha$ and $\Delta\tau$ to be sufficiently small. This can be understood by a counterexample: Suppose $\Delta\alpha$ and $\Delta\tau$ are large, for example, 5 dB and 500 ps, respectively. For the case in which the global minimum lies only 0.5 dB and 120 ps away from the current attenuation and delay settings, the global minimum would be missed entirely. Therefore, smaller increments will provide a greater resolution in the search for the global minimum. Of course, a smaller step size may certainly increase the number of steps which need to be taken. It is therefore preferred that the response times of the optical attenuator and delay line are taken into consideration as well, in order to facilitate rapid convergence to the minimum. The exemplary setup shown in FIG. 13 used $\Delta\alpha=1$ dB and $\Delta\tau=100$ ps. These values were decided upon because of practical limitations such as the lengths of optical fibers that were available, and the amounts of additional attenuation imposed by the 1:4 optical power splitters, for example. These would not be issues of concern if the system was implemented in integrated form, since a precise value of $\Delta\tau$ could be fabricated into the substrate; and arbitrary-length waveguides could be fabricated and matched to close tolerances. Some additional, general comments are in order regarding practical implementation of the optical cancellation system. The programmable, motorized optical delay line in an implementation of the optical cancellation system can provide a maximum delay of 600 ps. This number is a practical limitation on the amount of optical correction that can be applied. Effectively, this means if more than 600 ps of time delay exists between the two A-signals upon their entry into the optical cancellation system, then the optical cancellation system (in its current form) will not be able to provide optimal cancellation. In summary, then, the cancellation level is a function of the optical attenuation and delay resolution, as well as the optical delay range. The exact nature of this function will depend on the mathematical expression(s) defining the signal to be cancelled. Strictly speaking, the cancellation level is also a function of the optical attenuation range as well, but this detail need not be considered. This is because sufficient RF attenuation must be affixed to the optical cancellation system inputs to ensure that excess power is not presented to the system. Although imbalances will persist, modem optical attenuators-such as the one used in the current optical cancellation system implementation-will provide sufficient attenuation range to compensate for them. Regarding optical delay range and resolution, the fact remains that these will impose a limit on the amount of cancellation that can be achieved. However, integrated-optic technology allows for the fabrication of integrated delays that are as small as photolithography techniques will allow. The range of such integrated delay lines, and the number of delays which can be incorporated on a given substrate, will be limited by size and cost constraints.

Until this point, we have assumed that the mismatches in the A-signals which reach the optical cancellation system are direct outputs of a resistive RF power splitter or divider. Of course, this is a somewhat idealized situation, leading to minimal imbalances at the optical cancellation system inputs. These imbalances may be due to slightly mismatched frequency responses in the coaxial cables feeding the optical cancellation system, slightly mismatched lengths in those cables, or mismatches in the electro-optic modulators' electrodes, for example. It is also possible there may be some error in the imbalance measurements provided by the oscilloscope. In any event, again, those imbalances will be minimal. While adaptive compensation of such "idealized" mismatches is adequate for proof-of-principle results in a laboratory setting, it is equally important to anticipate the kinds of mismatches which may occur in practice—and discuss how they might be compensated-as an impetus for future investigation. One cause of imbalances between the A signals is relative motion between the transmitting and receiving antennas. It is reasonable to assume that such movements will occur on the order of milliseconds. Therefore, the control loops described herein will need to operate on the order of milliseconds; ideally faster. The speed of adjustment preferably is faster than the speed of the anticipated fluctuations. As a consequence, the motorized optical delay line currently used in the system would not be suitable in a more practical scenario, unless relative motion between the antennas could be minimized. In this case, the use of integrated optical delays would be more appropriate. Another cause of imbalances between the A-signals is multipath propagation effects.

C. Stability

For the present problem of interference cancellation by analog subtraction, stability is defined as convergence to a minimum value of power. The undesirable oscillatory response corresponds to fluctuation in the optical cancellation system's A signal output power between two points, on the power-versus-($\alpha$, $\tau$) surface, which differ from the global minimum on that surface. The undesirable response of unbounded increase corresponds to complete offshoot from the global minimum on that surface. The unbounded-increase response may be avoided by the use of initial error correction. Avoidance of the oscillatory response requires the use of small steps in optical attenuation and delay. This may be stated more precisely by revisiting Equation (2) above, and expanding it into its Taylor series about the point of perfect cancellation ($\alpha=\phi=0$):

$$\alpha^2/2+(1-\cos\phi)(1-\alpha)\approx\tfrac{1}{2}[\alpha^2+\phi^2-\alpha\phi^2+O(\alpha^2\phi^2)]$$

This last equation shows that, in the vicinity of the global minimum of power, the power-versus-($\alpha$, $\phi$) surface behaves as an elliptic paraboloid. In the case of the parameter-offset method, one is then guaranteed to have a stable operating point at that minimum, provided $\Delta\alpha$ and $\Delta\tau$ are small. Similar reasoning applies to the dithering method as well. The requirement of small $\alpha$ and small $\tau$ was met in the implementation of the dithering method by provisioning for small increments of current and delay in the LabVIEW VI.

These increments were automatically varied by the VI: at any given time, the present increment was varied according to the previous change in attenuation or delay (dependent on whether that change was an increase or decrease in the signal-output power).

Remote Interference

When interference is generated by a third party with no a priori knowledge of its characteristics, it is our view that it is necessary to estimate said interference prior to removing it from the signal of interest. The optical interference cancellation techniques described herein can be enhanced by use of interference estimation, thereby creating a hybrid ICS.

Figure 14:
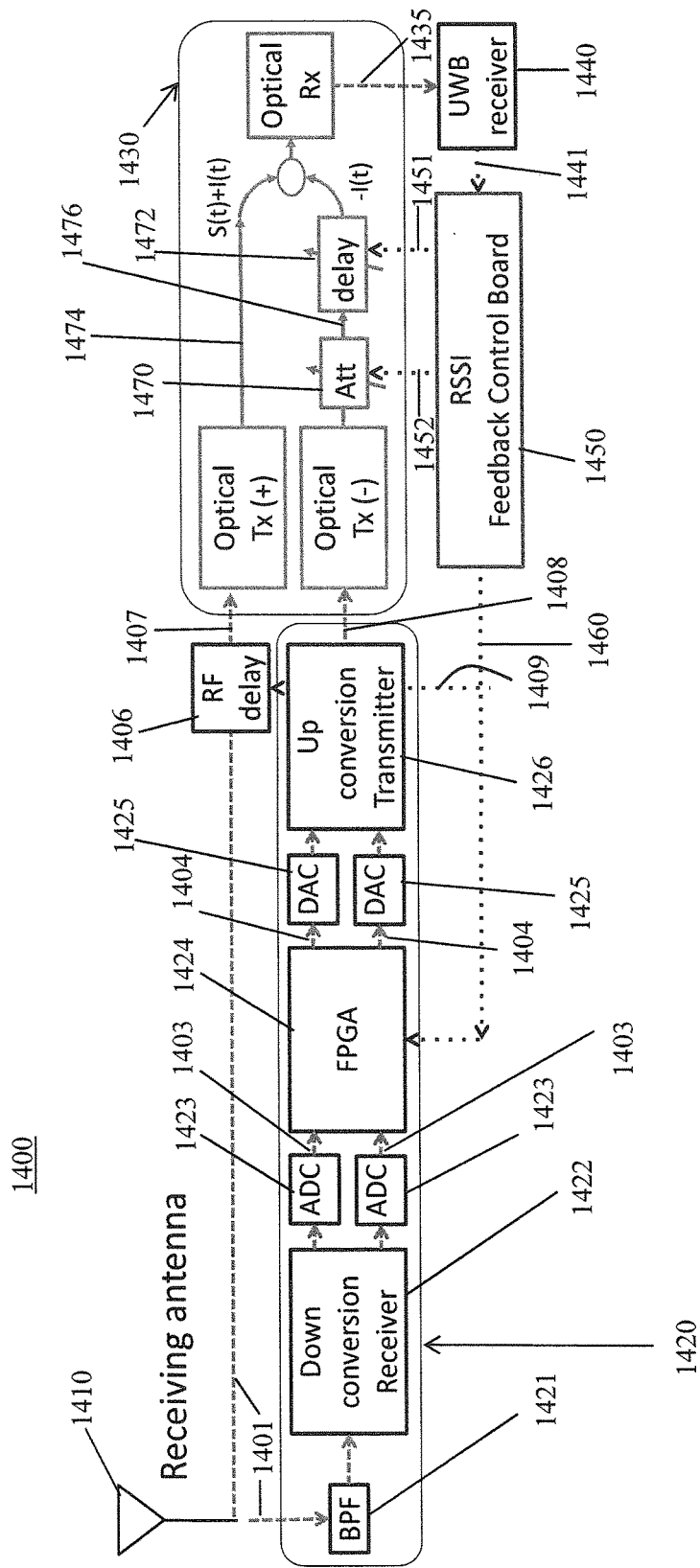
FIG. 14 is a block diagram illustrating a hybrid interference cancellation system in accordance with the present invention.

An example of a hybrid ICS is depicted in FIG. 14, which shows a schematic of hybrid ICS 1400. Antenna 1410 receives signal 1401, which is then input into RF delay 1406 and interference estimation processor or module 1420. The outputs of RF delay 1406 and interference estimation processor 1420 serve as inputs to optical ICS 1430. In an exemplary embodiment, antenna 1410 may be integrated into interference estimation module 1420.

RF delay 1406 introduces a phase shift, or delay, to signal 1301, where said delay is tuned via a closed-loop control system. In an exemplary embodiment, said closed-loop control system is RSSI feedback control board 1450. RF delay 1406 is included to compensate for the delay introduced by interference estimation processor 1420, thereby allowing a closer match between the delayed signal 1401 output by RF delay 1406 and the estimated interference signal output by interference estimation processor 1420 when said respective signals are input into optical ICS 1430. In an exemplary embodiment, RF delay 1406 can be any delay inducing element, including without limitation a coaxial cable or tunable "trumpet". In an exemplary embodiment, feedback control board 1450 comprises a power integrator and a FGPA board.

Interference estimation processor 1420 comprises band-pass filter 1421, down conversion receiver 1322, analog-to-digital converters 1423, FPGA 1424, digital-to-analog converters 1425, and up conversion transmitter 1426, which are connected as shown in FIG. 14. In an exemplary embodiment, interference estimation processor 1420 is an Altera Cyclone III FPGA development board combined with a data conversion card having two channels of 14-bit analog-to-digital conversion and digital-to-analog conversion, capable of operating at 150 MS/s and 275 MS/s, respectively.

Band-pass filter 1421 is any suitable band-pass filter; in an exemplary embodiment, band-pass filter 1421 has a bandwidth of 3 dB of signal 1401. After filtering by band-pass filter 1421, down conversion receiver 1422 adjusts the frequency of (heterodynes) the incoming signal, allowing it to be processed by analog-to-digital converter 1423 which converts analog signal 1401 into digital signal 1403. FPGA 1424 then receives digital signal 1403 and performs signal processing algorithms on said digital signal 1403, as more fully described in FIG. 15, to convert said digital signal 1403 into processed digital signal 1404. Processed digital signal 1404 proceeds to digital-to-analog converter 1425, which converts processed digital signal 1404 into estimated interference signal 1405. Estimated interference signal 1405 is an analog electrical signal. Up conversion transmitter 1426 receives estimated interference signal 1405 and adjusts the frequency of estimated interference signal 1405 so that its phase matches that of signal 1401.

Interference estimation processor 1420 communicates estimated interference signal 1405 to optical ICS module 1430 via input 1408. For RF applications that operate in VHF and UHF bands, and that require compact foot print with low driving power, the ICS 1430 can also be implemented using a pair of laser diodes that have matched performance in frequency responses and dynamic ranges. Path 1474, that contains signal of interest S(t) and interferer I(t), is directly changing the driving current for one laser diode. While the path 1476 that contains I(t) only is first inverted with a broadband operational amplifier, and thus −I(t) is modulated onto the optical carrier. Two optical paths are combined with an optical coupler and converted back to RF signal after the photo-receiver. With an inverted I(t) adjusted via its amplitude and delay in the optical domain, a clean S(t) is obtain at the output. RF delay 1406 outputs a delayed (i.e., phase shifted) version of signal 1401 to input 1407 of optical ICS 1430. Optical cancellation system 1430 then removes estimated interference signal 1405 from signal 1401 using methods previously described herein. The output of optical cancellation system 1430 is then communicated to ultra wideband receiver 1440 via optical ICS output 1435. Ultra wideband receiver 1440 communicates with RSSI feedback control board 1450 via UWB output 1441. RSSI feedback control board 1450 communicates with optical cancellation system 1430 via first RSSI output 1451 to control optical delay 1472. RSSI feedback control board 1450 communicates with optical cancellation system 1430 via second RSSI output 1452 to control optical attenuator 1470. RSSI feedback control board 1450 also communicates with interference estimation processor 1420 via output 1460 to communicate information to RF delay 1406 and to FPGA 1424. These various control outputs allow hybrid ICS 1400 to self-tune the various attenuators and delays, thereby providing a deep level of cancellation.

In one embodiment, FPGA 1424 is a field programmable gate array. However, FPGA 1424 may be implemented as an application-specific integrated circuit (ASIC) or in software running on a suitable general purpose processor (collectively, a "processor").

Interference estimation process 1500 separates the signal of interest from the narrowband signal based on the different statistical properties of said respective signals. Several different algorithms can be used to estimate the interference signal, depending on the type of narrowband signal. The interference estimation process can employ the different algorithms to achieve the best cancellation. In an exemplary embodiment, the interference estimation process uses a linear FIR predictive technique with least mean square (LMS) adaptive algorithm, which has been shown to adapt easily with high stability. Though it is well know that an adaptive LMS filter can accurately track a simple sinusoidal signal, a single LMS does not perform well for modulated signals. A dual adaptive filter can be used to track modulated interference signals.

Figure 15:
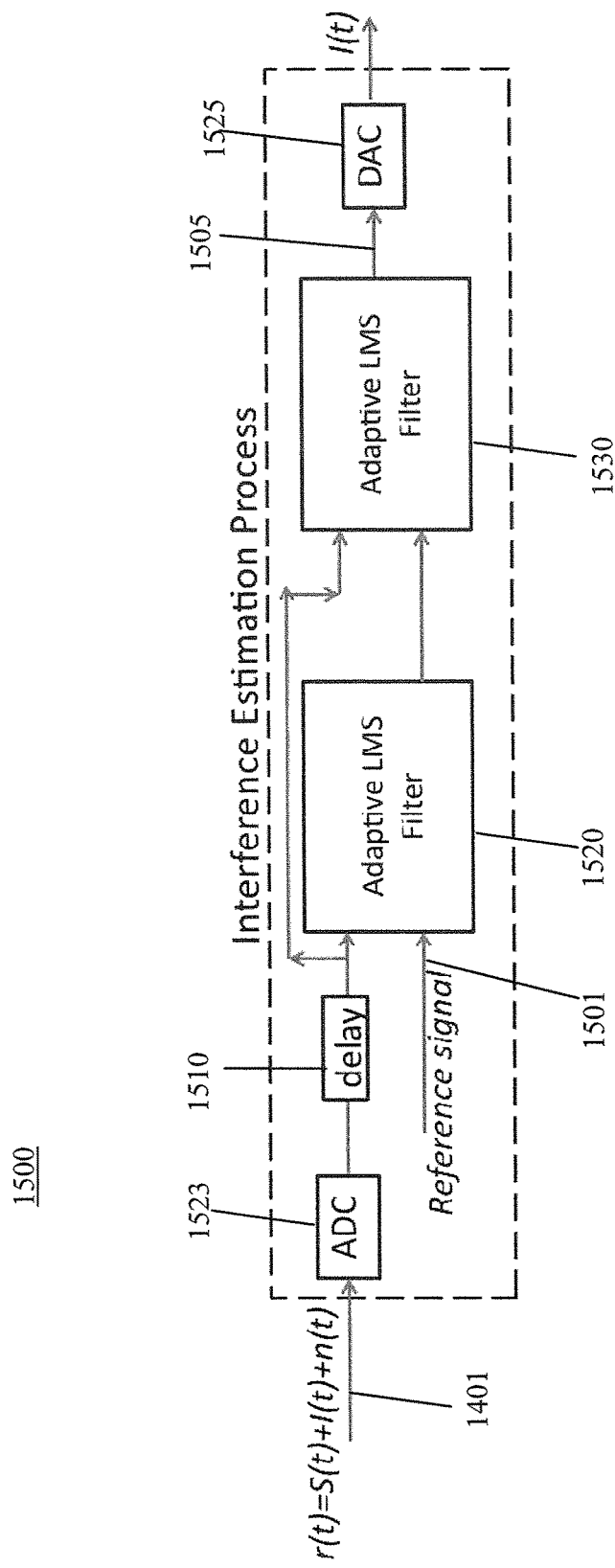
FIG. 15 is a block diagram illustrating an interference estimation process used in an exemplary embodiment of the present invention.

FIG. 15 is a block diagram showing interference estimation process 1500 employing a dual adaptive LMS filter, which in an exemplary embodiment is implemented in FPGA 1424. After passing through analog-to-digital converter 1523, a delay 1510 is introduced to signal 1401 (in an exemplary embodiment, this delay is implemented as a function of FPGA 1424), and delayed signal 1401 is input into first adaptive LMS filter 1520 and second adaptive LMS filter 1530. Also input into first adaptive LMS filter 1520 is reference signal 1501, where reference signal 1501 is a delayed copy of signal 1401. The output of first adaptive LMS filter 1520 then serves as an input into second adaptive LMS filter 1530. The output of second adaptive LMS filter 1530 is finally processed by digital-to-analog converter 1525.

Figure 16:
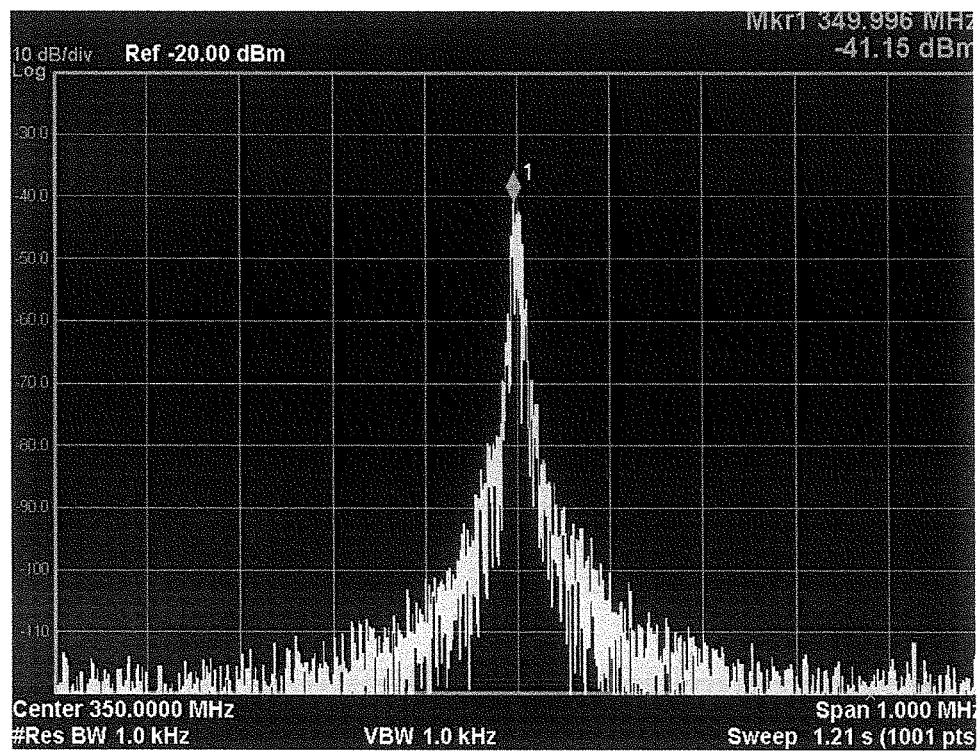
FIG. 16 is a graph showing the narrowband interference signal input into the interference estimation processor included in an exemplary embodiment of the present invention.
Figure 17:
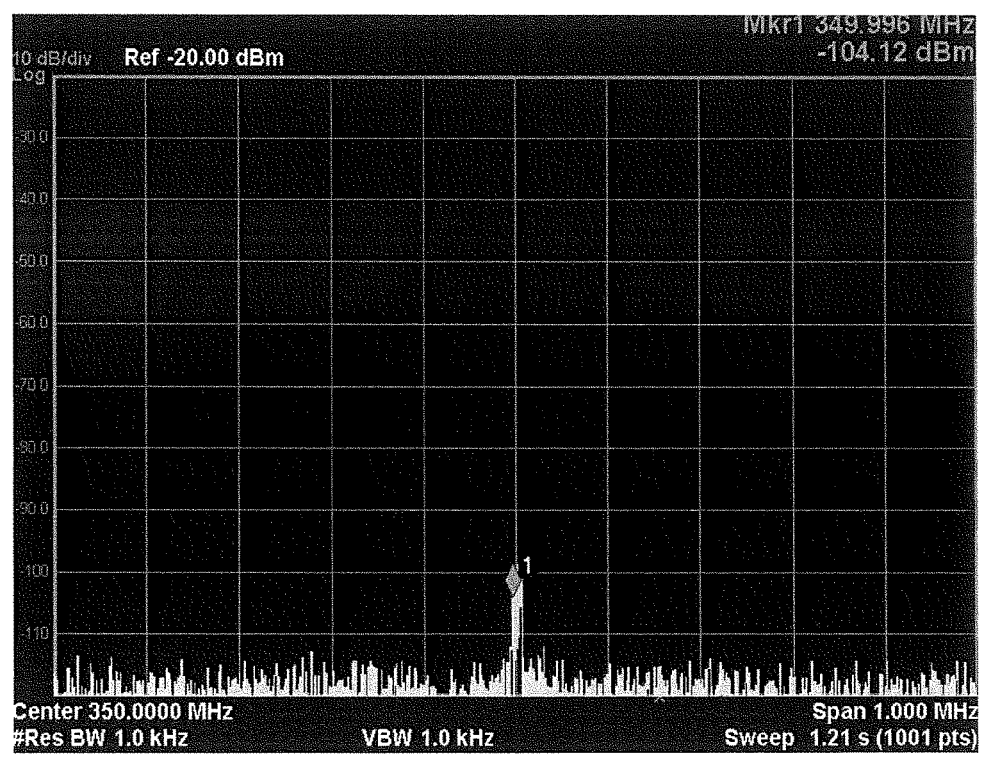
FIG. 17 is a graph showing the output of the optical ICS showing 63 dB of cancellation of the narrowband interference signal shown in FIG. 16.

For a case where only narrowband interference (NBI) is present, and signal 1401 passes through the interference estimation processor 1420 directly without any filtering, the analog-to-digital converter 1423, digital-to-analog converter 1425 and FPGA 1424 add little noise to the signal. In a test scenario demonstrating 63 dB of cancellation for NBI with 10 kHz frequency modulation, the NBI input signal input into the interference estimation processor and the cancelled signal output from the optical ICS, as measured on a spectrum analyzer, are shown in FIGS. 16 and 17, respectively.

Figure 18:
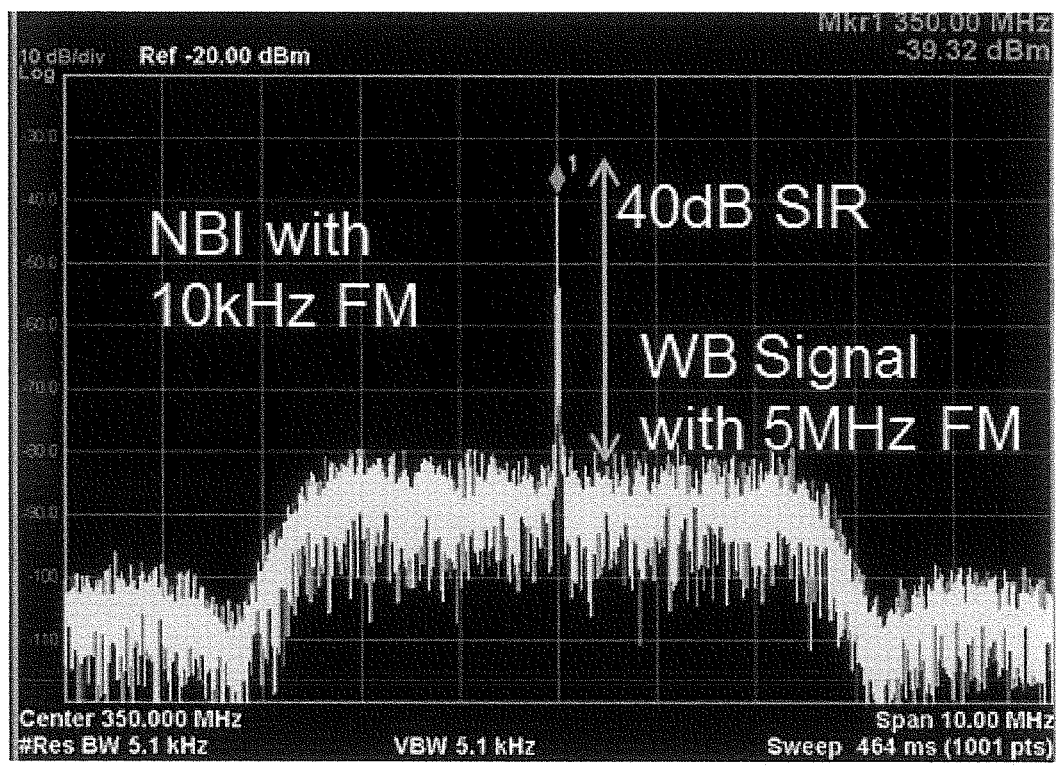
FIG. 18 is a graph showing the spectra of the signal, with both NBI and the signal of interest present, at the input of the interference estimation processor in an exemplary embodiment of the present invention.
Figure 19:
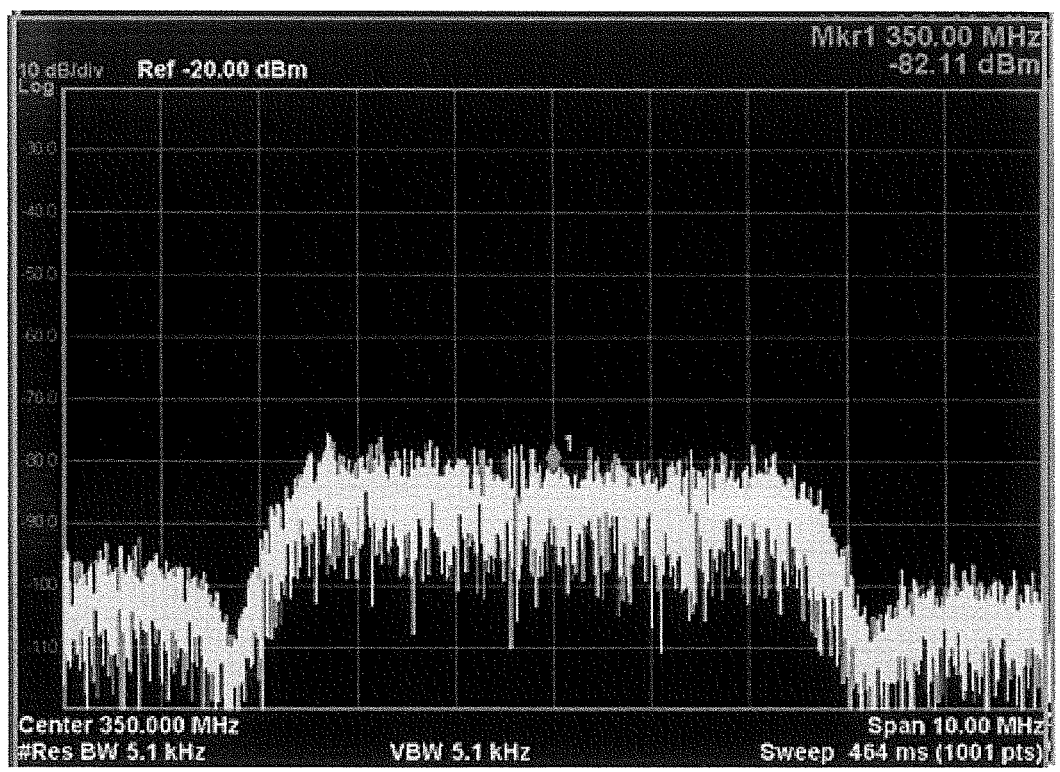
FIG. 19 is a graph showing the spectra of the signal at the output of the optical ICS in an exemplary embodiment of the present invention.

FIGS. 18 and 19 show the spectra of the signal, with both NBI and the signal of interest present, at the input of the interference estimation processor in an exemplary embodiment and the output of the optical ICS, respectively. The bandpass filter in the interference estimation processor was still relatively wide for the NBI (namely, 1 MHz), and as a result, part of the signal of interest was cancelled at the optical ICS. As noted above, the optical ICS is capable of more than 60 dB of cancellation, and we speculate that with optimized filtering and LMS adaptive filter implementation, it is possible to achieve similar performance.

Multipath Removal

Figure 20:
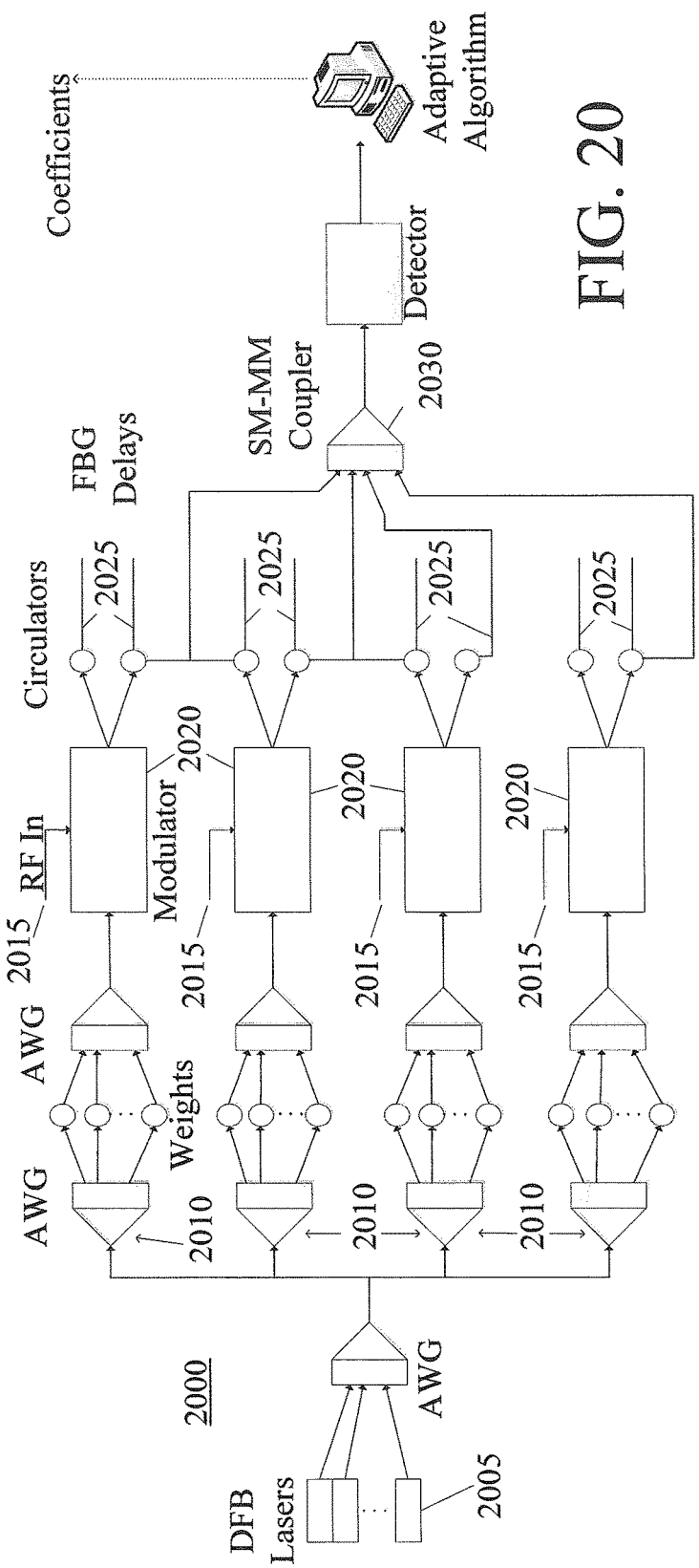
FIG. 20 shows a block diagram of a multipath compensation system employed in an exemplary embodiment of the present invention.
Figure 21:
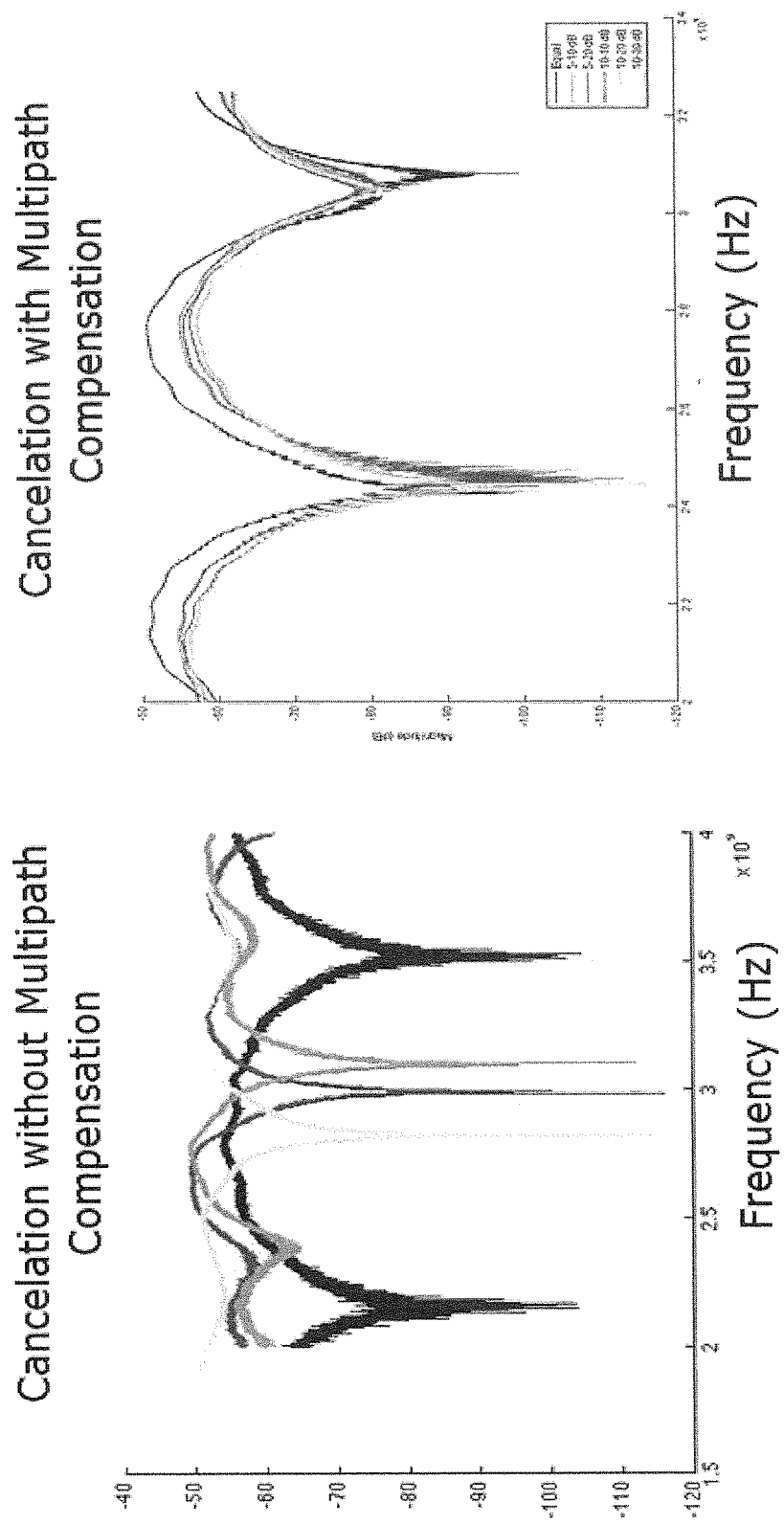
FIG. 21 is a pair of graphs showing the output of an optical ICS with, and without, multipath compensation.

Multipath mitigation is an important part of the interference cancellation system. A system with additional multipath compensation branches can be implemented as shown in FIG. 20. Multipath removal demonstration system 2000 is designed to be highly scalable and flexible. The number of distributed feedback (DFB) lasers 2005 used corresponds to the number multipath components to be removed. The laser sources are multiplexed and weighted in an arrayed waveguide grating (AWG) weighting network 2010. Signals from the receive antenna 2015 are modulated onto the optical signal using Mach Zehnder (MZ) modulators 2020. The delay is tuned with a chirped fiber bragg gratings (FBG) 2025 based on the wavelength of the laser sources. Properly delayed and attenuated signals are combined with a single-mode to multi-mode coupler 2030 to allow the same source used for different receiving antennas without optical beat noise. Experimental results of two multipaths (i.e., a system addressing removal of two multi-path components, and thus requireing two "branches" of the system of FIG. 20) shown in FIG. 21, validating the mulitpath removal.

Figure 20A:
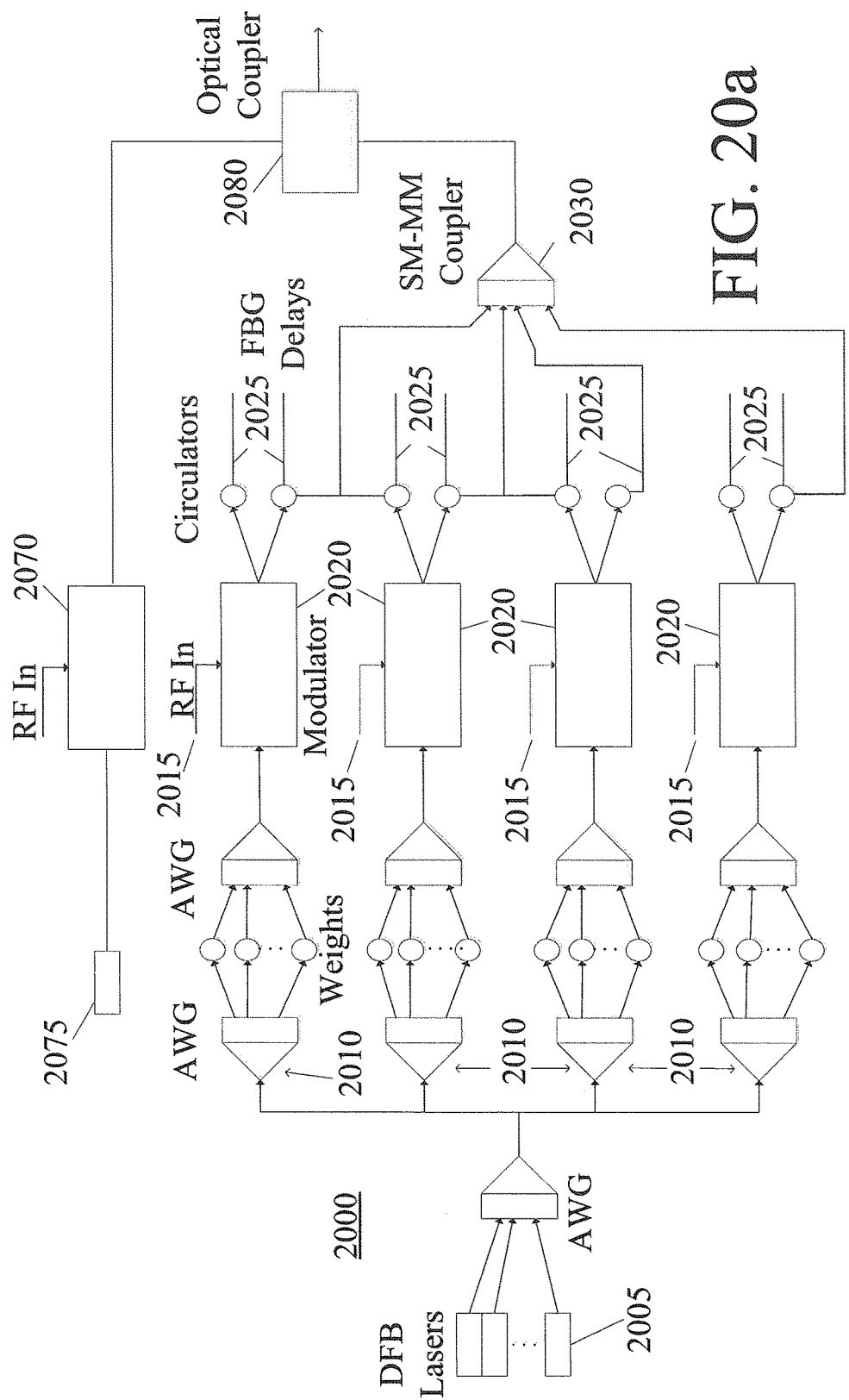
FIG. 20a shows a block diagram of an optical ICS which includes the multipath compensation system shown in FIG. 20 employed in an exemplary embodiment of the present invention.

In an exemplary embodiment, the multipath removal demonstration system 2000 may be implemented as part of an optical ICS system (such as that shown in FIG. 3) via the substitution of the entire system 2000 for the lower branch of the system shown in FIG. 3 (i.e., the branch taking laser 322 as its input), with all other general details of the system of FIG. 3 remaining essentially the same. An example of such a substituion is shown in FIG. 20a. In this embodiment, the modulators 2020 are biased such that they are in parallel counter-phase modulation with the upper branch modulator 2070 (where laser 2075 is analogous to input laser 302 shown in FIG. 3, modulator 2070 is analogous to modulator 301 in FIG. 3, and optical coupler 2080 is analogous to coupler 350 shown in FIG. 3).

Digital ICS

While it has been shown that the combination of an optical ICS and an electronic ICS can cancel a substantial amount of interference, this generally only accounts for the dominant self-interference component between the receiver and transmit antennas. Since a node's interference may also have weaker multipath components, as well as distortion arising in the cancellation signals within the optical ICS or electronic ICS, an additional digital cancellation system (DCS) can be used to cancel any residual interference. Such a digital cancellation system must be capable of real-time interference cancellation by estimating the channel frequency; using this channel estimate, along with the known transmitted signal, digital samples are created that are then subtracted from the received signal.

Estimation of the channel by the DCS will utilize known training symbols in the transmitted data packets, while modeling the effects of propagation through the wireless channel and cancellation circuitry as a single "self-interference" channel. Through the use of minimization algorithms such as least mean-square, the DCS can estimate the frequency response of the self-interference channel and the Inverse Fast Fourier transform can be applied to obtain the time-domain response of the channel. Digital samples of the transmitted signal can be generated from the time-domain response and emulated using tunable finite impulse-response (FIR) filters. These samples are generated by convolving the known signal with the FIR filter response, thus representing the estimated channel. The samples are then subtracted from the received digital samples to eliminate any remnants of the transmitted signal. The implementation of a DCS in the context of a systems approach to interference cancellation is described in more detail below.

Tower ICS

Figure 22:
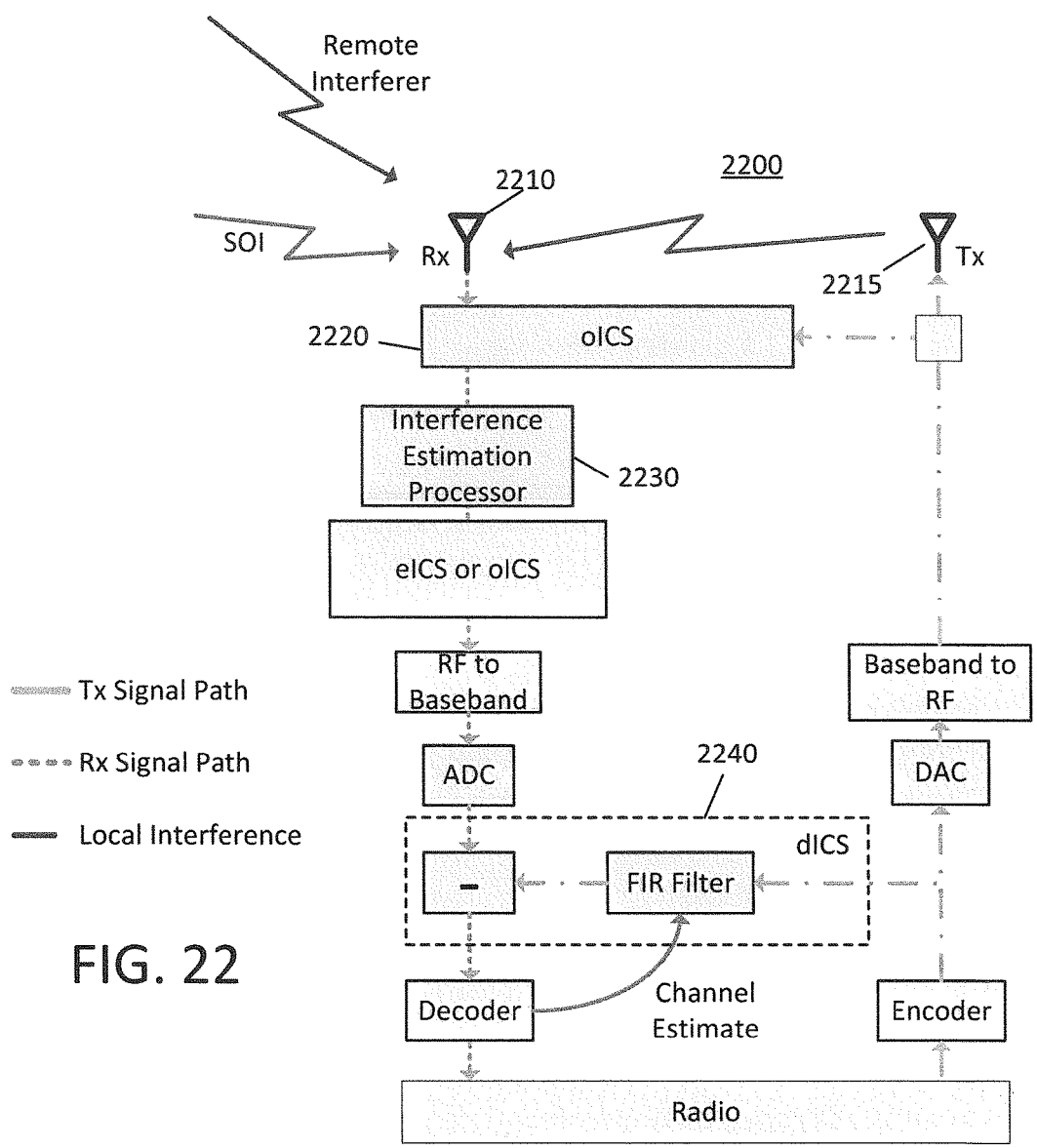
FIG. 22 is a block diagram illustrating an exemplary embodiment of a hybrid interference cancellation system of the present invention.

In one embodiment of the present invention, the various interference cancellation methods discussed above are combined in a tower ICS 2200, shown in FIG. 22. Tower ICS 2200 includes an optical ICS 2220 which provides wideband and very deep cancellation of a signal that is generated from, caused by or otherwise attributable to a co-located transmitter or from a reflection of the co-located transmitter. In some cases the reflection of the co-located transmitter is from an object, such as a car in motion, resulting in rapidly changing characteristics that cannot be accounted for with optical signal processing. Additionally, remote interferers can also cause problems that cannot be adequately addressed with optical approaches. These last two cases require techniques that are best-performed using RF electronic signal estimation and isolation. Consequently, tower ICS 2200 also includes RF electronic based signal estimation via interference estimation processor 2230. In an exemplary embodiment, optical ICS 2220 and interference estimation processor 2230 are configured in a manner similar to the hybrid ICS shown in FIG. 14. Lastly, additional signal processing (i.e., digital) based ICS can be carried out to further increase the level of interference removal (as described above). To that end, digital ICS 2240 is also included. Finally, antenna-based cancellation approaches can also be added to the front end of the system to provide larger levels of cancellation if required.

Figure 23:
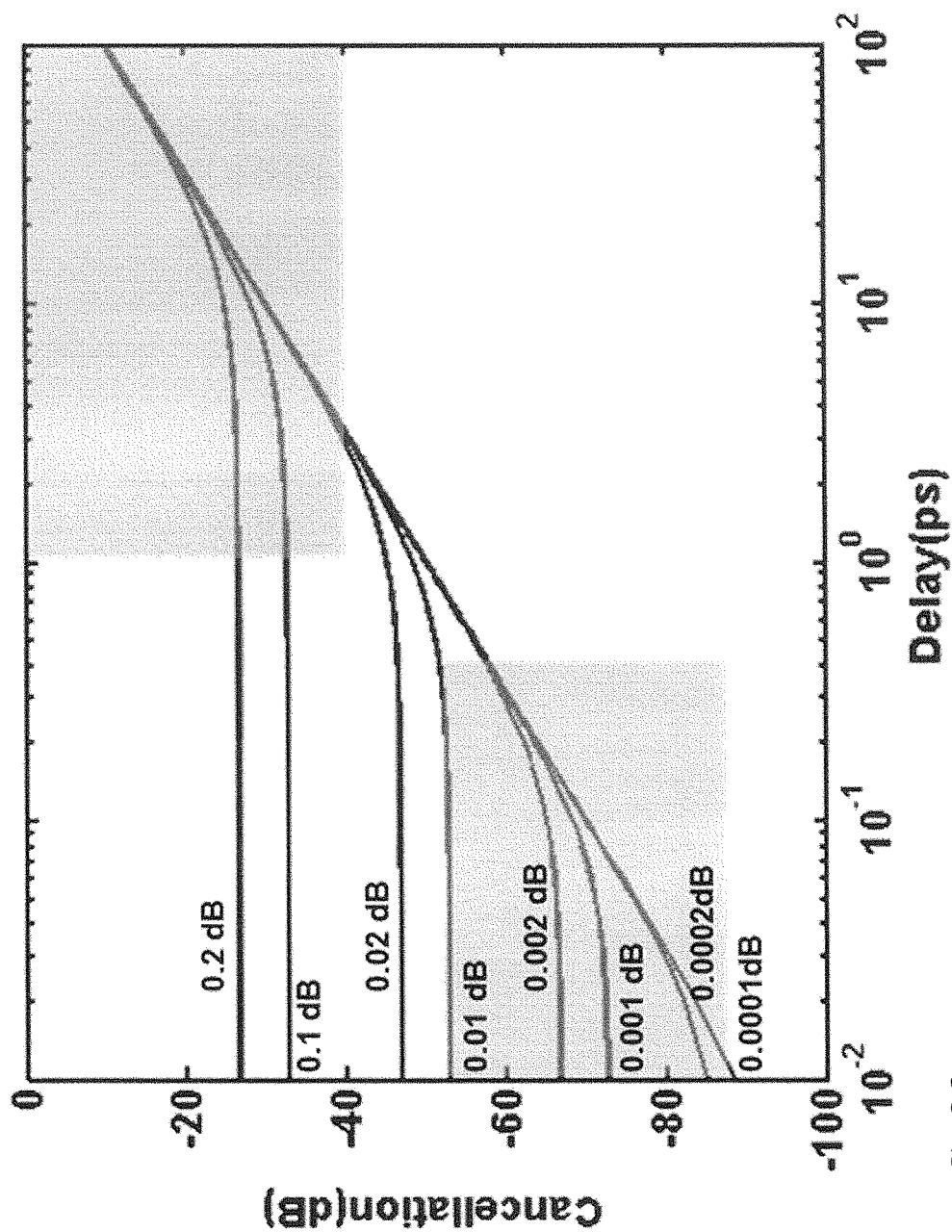
FIG. 23 is a graph showing precision requirements for given levels of theoretical interference cancellation.

In operation, optical ICS 2220 is used to first remove the main self-interference directly from the Tx antenna in a manner consistent with the optical ICS system previously disclosed herein. This optical ICS can provide accurate adjustment of the amplitude and delay for deep cancellation because of the precision provided by the optical components. The theoretical calculation of the cancellation vs. precision requirements in attenuation and delay, shown in FIG. 23, indicates that in order to achieve more than 60 dB of cancellation, the amplitude has to be matched within 0.01 dB and the delay must be less than 0.1 ps. The optical attenuator and delay within optical ICS 2220 can easily provide such precision ranges for the level of cancellation required.

RF interference estimation processor 2230 is included between the receiver 2210 and the optical ICS 2220 to estimate the time-varying multipath reflection from nearby buildings or a moving car. Tower ICS 2200 can also include optical multipath compensation (see FIG. 20), and when employing multipath compensation, it is more practical to introduce delay via a phase shifter (as opposed to introducing true-time delay) since the delay range between the multipath components can be quite large. Moreover, phase shifters can adapt very quickly. After the removal of the strong self-interference with the optical ICS 2220, and multipath components with the RF channel estimator 2030, the signal-to-interference-noise-ratio (SINR) is significantly improved, the limitation on the dynamic range is mitigated, and digital signal processing can then be used for additional remote interference removal. This hybrid ICS design can potentially provide more than 100 dB of cancellation over a wide instantaneous bandwidth (>100 MHz).

Handheld ICS

Figure 24:
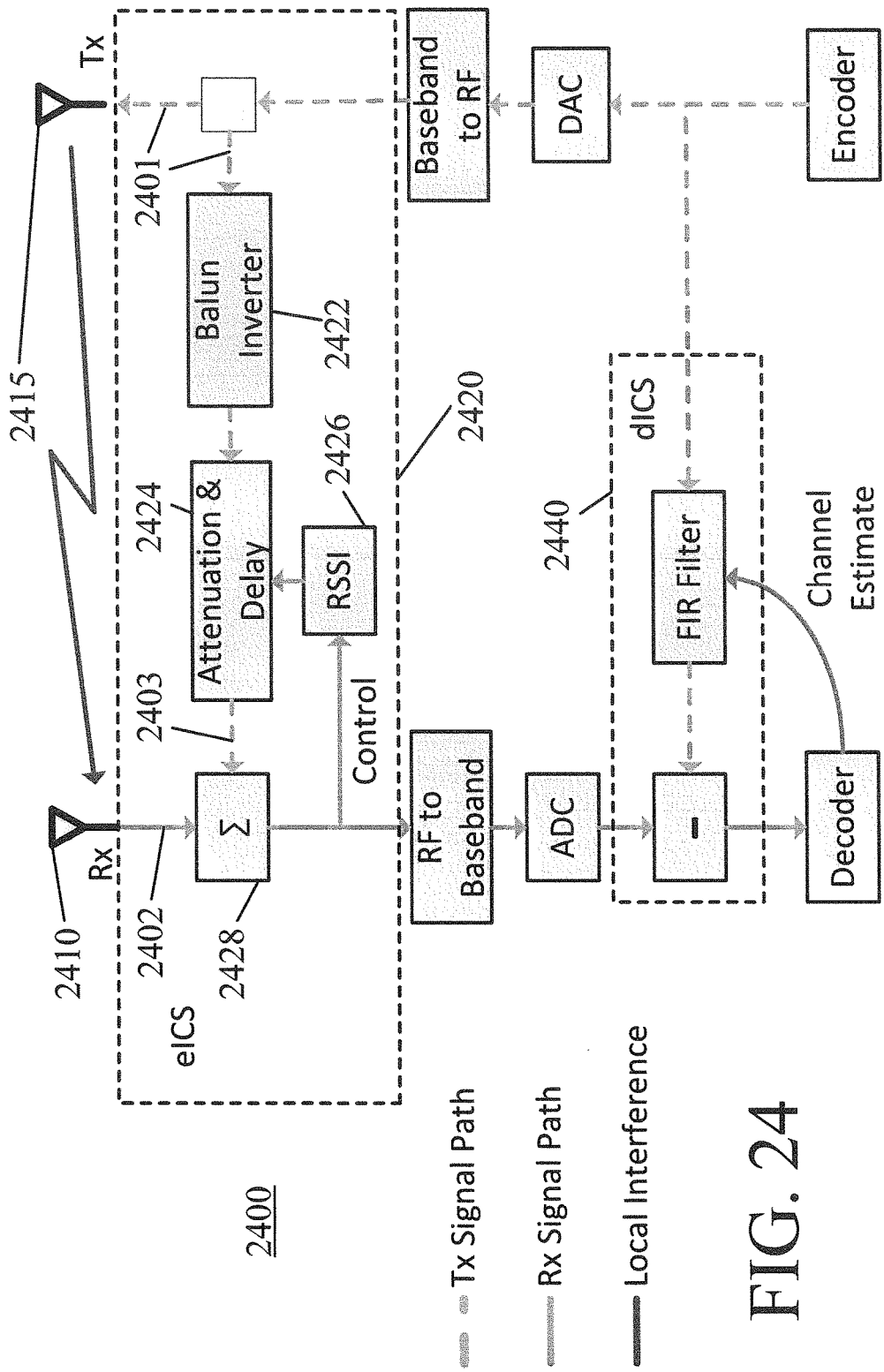
FIG. 24 is a block diagram illustrating an exemplary embodiment of a portable hybrid interference cancellation system of the present invention.

The present invention also contemplates an ICS included in handheld devices. In such a device, weight and power constraints are the primary considerations since the required instantaneous bandwidth is narrow and the required level of co-site cancellation is typically less than that of the tower. A combination of an electronic ICS (eICS) (also referred to as an electronic interference cancellation module) and digital cancellation is best suited for the handheld application. In addition, the envisioned architecture only requires a single member of the tower/handheld pair to deal with the remote interferer. This is because if remote interference occupies the channel in which they are communicating, the handheld device will be able to suggest an alternative channel and the tower can continue to monitor the transmissions from the handheld until the change in channel is implemented. FIG. 24 shows the schematic of the architecture for the handheld ICS 2400.

In the embodiment depicted in FIG. 24, the eICS 2420 is based on the Intersil® QHx220 ICS demo unit. The eICS depicted in FIG. 24 takes a sample of the signal-to-be-transmitted 2401, inverts same via Balun Inverter 2422, applies attenuation and delay to said inverted signal via attenuation and delay stage 2424, and combines said inverted, attenuated and/or delayed version of signal 2401 to incoming signal 2402 via summer 2428. The attenuation and delay applied in the eICS is tuned using the received signal strength indication (RSSI) 2426. Once the dominant self-interference component is removed via eICS module 2420, additional filtering is obtained via digital ICS 2440 (again, as described in more detail above).

Figure 25:
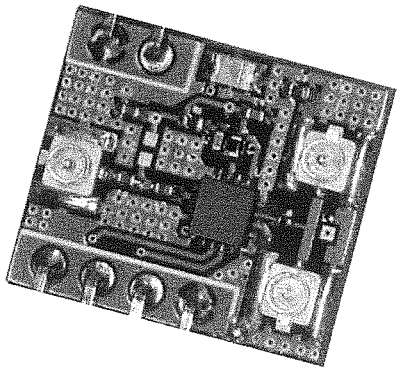
FIG. 25 is a picture of an Intersil® QHx220 electronic ICS used in an exemplary embodiment of the present invention.
Figure 26:
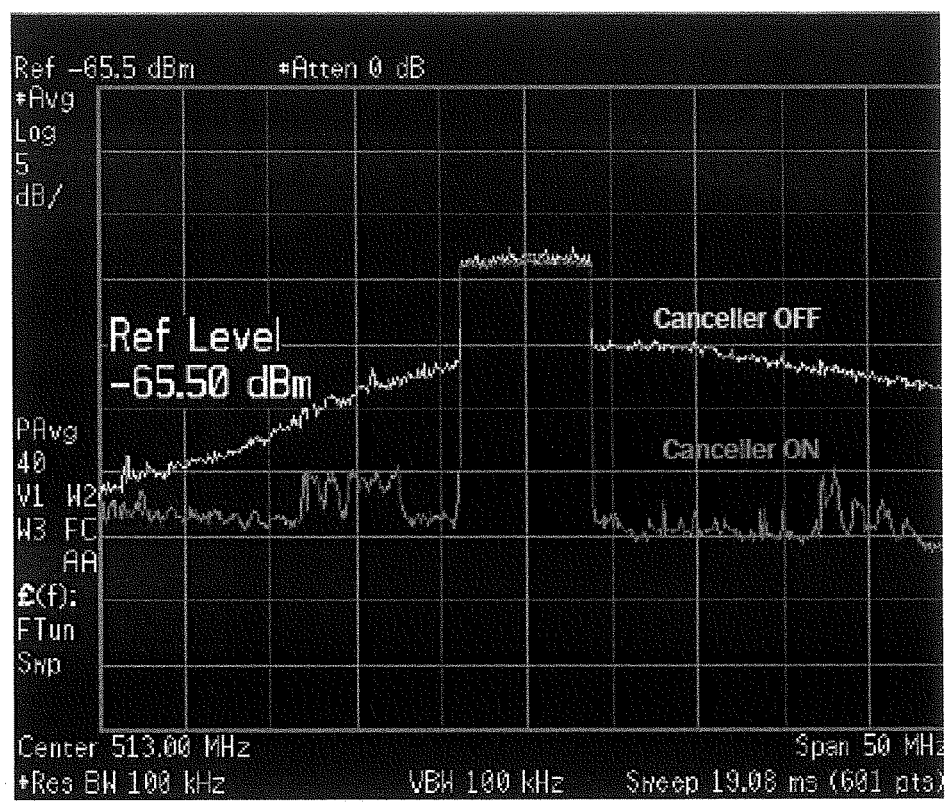
FIG. 26 is a graph showing measured results from the Intersil® QHx220 electronic ICS shown in FIG. 25.

The Intersil® eICS is based on electronic analog cancellation, is small, and can be integrated in a handset to sample the source of the noise and emulate the RF coupling channel between the noise source and victim receiver antenna. In doing so, an anti-noise signal 2403 can be applied directly to the victim receive path to cancel the interference and achieve the signal integrity benefits. This approach makes it possible to cancel both in-band (within the victim Rx band) or out-of-band aggressors. In addition the Intersil® QHx220 may be used to increase the inherent isolation between antennas or inside duplexers and switches, thus allowing an increase in the transmit power in repeaters or yielding higher sensitivity in receivers. The Intersil® QHx220 integrates the sampler path LNA gain stages as well as the DACs required to control the in-phase and quadrature control voltages (used to set the magnitude and phase of the cancellation signal). Both the gain and the control voltages are programmable using a SPI bus interface. FIG. 25 depicts the system, and FIG. 26 shows measured results of the Intersil® system. In an alternative embodiment, electronic interference cancellation (i.e., eICS) may be performed in either the analog or the digital domain.

Full Duplexing

Currently, many 3G cellular networks operate using a frequency division duplexing (FDD) method. FDD allows the system to emulate a full duplex system by separating the uplink and downlink frequency bands and inserting a band gap between the two. This allows for the cellular equipment to transmit and receive on two different frequency bands in order to reduce interference. While this method works, more efficient use of the frequency spectrum can be achieved by making this system a true full duplex and allowing full use of the entire spectrum.

The present invention is relevant to addressing the challenge of true full-duplex wireless communications. A full duplex wireless communications system simultaneously transmits and receives signals in the same frequency band. The main challenge of achieving such a system is the in-band self (co-site) interference between the Tx antenna and the Rx antenna at the base station. This is especially challenging because the received signal may be many orders of magnitude weaker than the adjacent transmitted signal. A systems approach that combines the various interference removal methods can achieve maximum interference suppression directly in the physical layer. Since a copy of the transmitted signal is easily obtained, the optical ICS is capable of providing both wideband and deep cancellation. After the removal of the co-site interferer, the received signal, along with any other interferers and noise, can then be sent though the digital ICS. At this stage, the WCDMA access method would be exploited in conjunction with the digital ICS in order to establish which components of the signal are desired and remove any components that may be interference from local cellular devices.

When a full duplex system is realized, the total bandwidth allotted to a given service provider would be used more efficiently and potentially increase the amount of throughput on the system three-fold. Band gap will no longer be needed to separate a downlink and uplink bands, and each cellular device would be allotted its own frequency band that would be used for both transmissions and receptions. As described earlier, a full duplex system would be obtained through co-site interference removal at both the cell tower and cellular device allowing for both systems to operate on the same frequency band.

Application to 4G

The next evolution of wireless communication is the LTE Advanced network. This system has been described as the first global communications network (although the frequency band will vary according to location). While this system is not backwards compatible with the 3G system, there would not be many differences in a co-site interference ICS.

The LTE Advanced networks have already been designed to utilize MIMO (multiple input multiple output) devices in order to boost download rates. Since the hardware already includes antenna arrays, digital beam forming can be easily added to the system to increase directivity of the antennas. This method would allow for a cellular device to "steer away" from interferers and focus its "attention" to the cell tower, improving signal reception.

Since the 4G network utilizes FDD techniques similar to 3G, the methods for co-site interference cancellation would be very similar to those applicable to 3G networks. A copy of the transmitted signal would be sent through the optical ICS as a reference in order to fully remove any components of the co-site interference from the received signal. After the co-site interference has been removed, the signal can then be passed through the digital ICS for further cancellation. In this stage, the interference can be estimated with no prior knowledge or it could use further functions of the LTE Advanced system to identify interfering signals. Since the LTE Advanced network is an internet protocol (IP) based system, the digital ICS could be programmed to work in conjunction with the radio in order to identify the IP address of any interfering signals and remove them.

The use of this ICS system would be capable of utilizing many of the improvements of the 4G network in order to further add to the cancellation efficiency over the 3G network and improve the overall reliability of the network. Along with the improved reliability, the LTE Advanced network would also be capable of an increased amount of throughput by the reduction of co-site interference and thus an increase in the amount of usable frequency spectrum.

Alternative Architecture: Antenna System with Beam Steering

Figure 27:
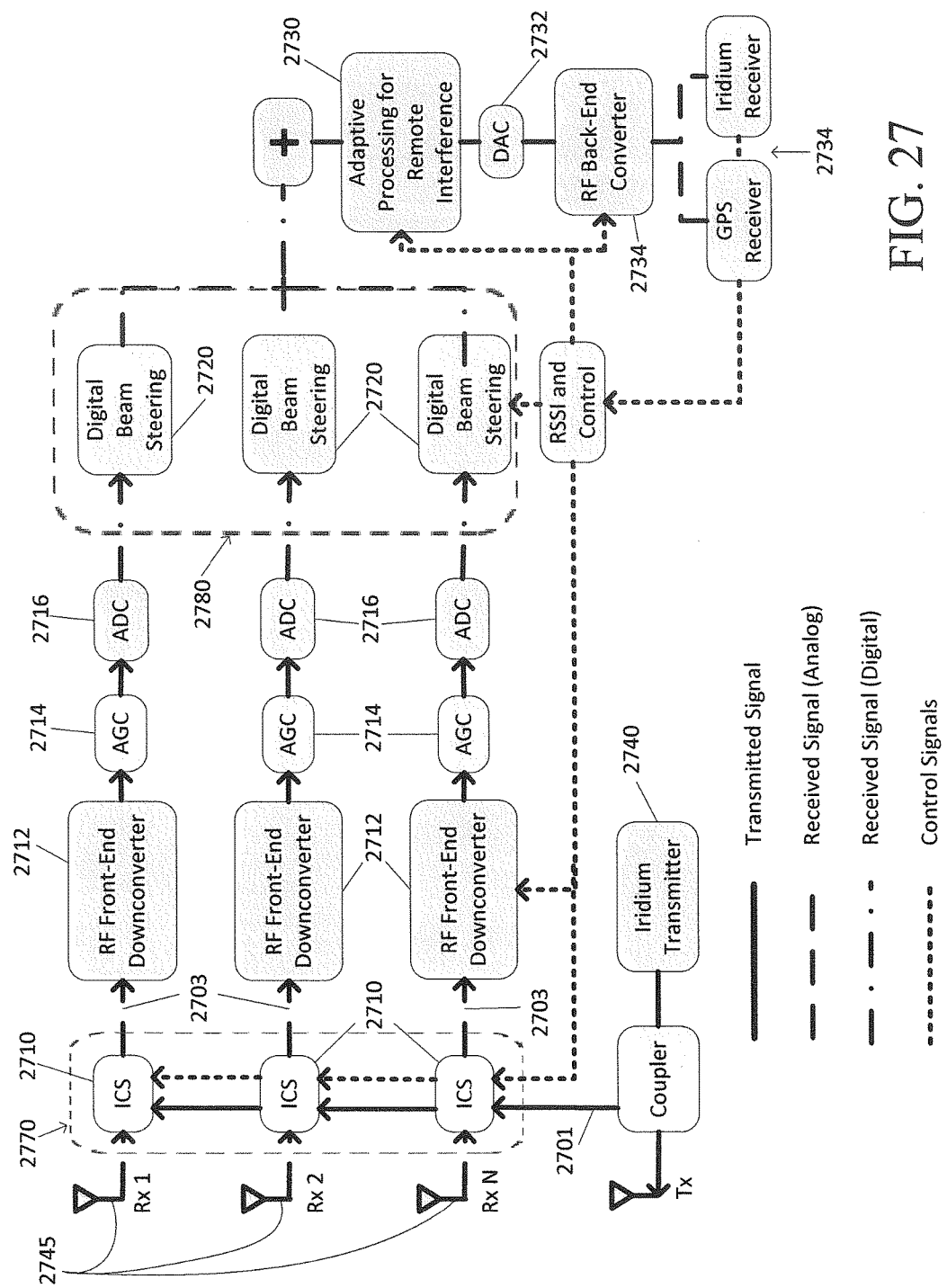
FIG. 27 is a block diagram of an exemplary embodiment of an alternative architecture for a hybrid interference cancellation system of the present invention.

An alternative approach to address the requirements discussed earlier is to use a combination of beam steering and ICS. FIG. 27 is a generic schematic of the baseline alternative concept. In this design, three forms of interference mitigation will be utilized: an active interference cancellation system 2770 for strong co-site interference, an antenna array system with beaming steering capability 2780 for multiple LOS signals with interference mitigation, and digital signal processing for remote co-directional interference 2730.

In this alternative architecture, the signal 2701 from the transmitter 2740 is directly coupled to each ICS 2710 after each antenna 2745 for co-site interference removal. The ICS configuration provides broadband and deep level of cancellation in line with the previous discussion herein. In selecting the order of the ICS, one of the key metrics that needs to be considered is the instantaneous dynamic range of the functional element. One of the reasons the active ICS is placed at the beginning of the processing system is that this approach has demonstrated over 80 dB of instantaneous dynamic range. Following the front-end circuit, the signal 2703 is actively downconverted in each channel to the intermediate frequency (IF) for proper filtering and sampling via RF Front-End downconverter 2712. An automatic-gain control (AGC) 2714 is also implemented to address the issue of large power level difference between the signal of interest (SOI) and potential interference signals, and the signal 2703 is passed through analog to digital converters 2716.

The beam steering algorithm for the antenna array system is implemented in the digital domain in this design via digital beam steering processors 2720. Consequently, beam steering weight networks with complex coefficients can be implemented with little additional resources. This capability will allow the system to better track the phase of the received signal. This approach can also easily comply with the size constraints faced in most ICS installations and is more flexible for various algorithms. An additional adaptive processing module 2730 is also included to estimate the signal in the presence of co-directional interference. The output of the system will be converted back to an analog signal via DAC 2732 and upconverted via RF back-end converter 2734 for a proper interface with the receiver 2736. The alternative architecture provides an example of the approach, but will potentially change based on the requirements of the system in which it will be installed.

One of the most well-established approaches to interference mitigation is beam steering. When phased antenna arrays are incorporated into the hardware of a device, algorithms may be used in order to calculate the angle of arrival for various signals as well as remove any signals in the directions that are determined to be interferers. A system such as the one shown in FIG. 27 would be capable of increased amounts of cancellation by focusing the antenna array on to the proper transmission tower. This would enable the device to ignore any interference from towers and other cellular devices that may be near enough to the receiver of interest in either position or frequency spectrum. The inclusion of beam steering to this system would enable the handheld devices to focus its reception at the proper tower and eliminate any interference from similar devices.

The foregoing description of the invention has been presented for purposes of illustration and description. It is not intended to be exhaustive or to limit the invention to the precise form disclosed, and modifications and variations are possible in light of the above teachings or may be acquired from practice of the invention. Where a given system, process, processor or module is described herein, it is recognized that it may be implemented together with other systems, processes, processors or modules, using shared hardware or other resources, or separately. The embodiments disclosed were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. An interference cancellation system, comprising:
a receiver coupled to a single receiving antenna or array, the receiver being configured to receive a first signal;
an interference estimation module, wherein said interference estimation module is configured to receive said first signal from said receiver, to estimate and to output an interference component of said first signal; and,
an optical interference cancellation module in communication with said interference estimation module, wherein said optical interference cancellation module receives said first signal and said estimated interference component, and wherein said optical interference cancellation module is configured to optically cancel at least a portion of said estimated interference component from said first signal.

2. The interference cancellation system of claim 1, further comprising a control subsystem configured to automatically control one or more of said optical interference cancellation module and said interference estimation module.

3. The interference cancellation system of claim 2, wherein said control subsystem comprises an open loop control subsystem.

4. The interference cancellation system of claim 2, wherein said control subsystem comprises a closed loop control subsystem.

5. The interference cancellation system of claim 4, wherein said closed loop control subsystem employs a dither method of feedback control.

6. The interference cancellation system of claim 5, wherein said control subsystem comprises an open loop control subsystem.

7. The interference cancellation system of claim 5, wherein said control subsystem comprises a closed loop control subsystem.

8. The interference cancellation system of claim 4, wherein said closed loop control subsystem employs a parameter offset method of feedback control.

9. The interference cancellation system of claim 1, further comprising a transmitter in close proximity to said receiver, wherein said transmitter is capable of generating a second signal, wherein said first signal includes an interference component attributable to the transmission of said second signal by said transmitter, and wherein said optical cancellation system is configured to receive said second signal and to optically cancel from said first signal at least a portion of said interference component attributable to the transmission of said second signal by said transmitter.

10. The interference cancellation system of claim 9, wherein said closed loop control subsystem employs a dither method of feedback control.

11. The interference cancellation system of claim 9, wherein said closed loop control subsystem employs a parameter offset method of feedback control.

12. The interference cancellation system of claim 1, wherein said optical interference cancellation module comprises: a first electro-optic modulator, a second electro-optic modulator, and an optical coupler; and,
wherein said optical coupler is connected to said first electro-optic modulator and said second electro-optic modulator, and wherein said first electro-optic modulator receives said first signal, said second electro-optic modulator receives said estimated interference component, and said first and second electro-optic modulators are biased for parallel counter-phase modulation.

13. The interference cancellation system of claim 12, further comprising: an optical attenuator connected to said second electro-optic modulator, and an optical delay connected to said second electro-optic modulator, wherein said second electro-optic modulator is connected to said optical coupler through said optical attenuator and said optical delay.

14. The interference cancellation system of claim 13, further comprising a control subsystem configured to automatically control one or more of said optical attenuator, said optical delay and said interference estimation module.

15. The interference cancellation system of claim 1, wherein said optical interference cancellation module comprises a dual parallel electrical radio-frequency-to-optical-signal converter, said converter comprising:
(a) an optical input for a light source and an optical output; (b) a first arm having a first refractive index; (c) a first electrode configured to vary said first refractive index; (d) a second arm having a second refractive index; and, (e) a second electrode configured to vary said second refractive index;
wherein said first electrode is configured to receive said first signal and said second electrode is configured to receive said estimated interference component.

16. The interference cancellation system of claim 15, further comprising an optical adaptive matched filter connected to said second arm.

17. The interference cancellation system of claim 16, further comprising a control subsystem configured to automatically control said optical adaptive matched filter.

18. The interference cancellation system of claim 17, wherein said control subsystem comprises an open loop control subsystem.

19. The interference cancellation system of claim 17, wherein said control subsystem comprises a closed loop control subsystem.

20. The interference cancellation system of claim 19, wherein said closed loop control subsystem employs a dither method of feedback control.

21. The interference cancellation system of claim 19, wherein said closed loop control subsystem employs a parameter offset method of feedback control.

22. The interference cancellation system of claim 1, wherein said optical interference cancellation module comprises a multipath component compensation system, wherein said multipath component compensation system is configured to estimate multipath interference components of said first signal, and wherein said optical interference cancellation module is further configured to optically cancel from said first signal at least a portion of said multipath components.

23. The interference cancellation system of claim 1, wherein said interference estimation module comprises:
- a band-pass filter configured to filter said first signal and generate a filtered first signal;
- a down conversion receiver configured to receive said filtered first signal and to reduce a frequency of said filtered first signal;
- one or more analog-to-digital converters configured to receive said filtered first signal from said down conversion receiver and to convert said filtered first signal to a digital signal;
- a processor configured to receive said digital signal and perform adaptive filtering on said filtered first signal to generate said estimated interference component;
- one or more digital-to-analog converters configured to receive said estimated interference component from said processor and to convert said estimated interference component to an analog version of said estimated interference component; and
- an up conversion transmitter configured to receive said analog version of said estimated interference component and to increase a frequency of said analog version of said estimated interference component.

24. The interference cancellation system of claim 23, wherein said processor is a field programmable gate array.

25. The interference cancellation system of claim 23, wherein said adaptive filtering process is a dual adaptive LMS adaptive filtering process.

26. A multi-unit interference cancellation system, comprising:
- a first receiver coupled to a single receiving antenna or array, the first receiver being configured to receive a first incoming signal;
- a first transmitter, in close proximity to said first receiver, said first transmitter capable of transmitting a first outgoing signal;
- a second receiver capable of receiving a second incoming signal;
- a second transmitter, in close proximity to said second receiver, said second transmitter capable of transmitting a second outgoing signal;
- a first interference cancellation system comprising a first optical interference cancellation module, wherein said first incoming signal includes one or more of a portion of said second outgoing signal and an interference component attributable to the transmission of said first outgoing signal, and wherein said first optical interference cancellation module is configured to receive said first incoming signal and said first outgoing signal and to optically cancel from said first incoming signal at least a portion of said interference component attributable to the transmission of said first outgoing signal; and,
- a second interference cancellation system comprising a first electronic interference cancellation module, wherein said second incoming signal includes one or more of a portion of
said first outgoing signal and an interference component attributable to the transmission of said second outgoing signal, and wherein said first electronic interference cancellation module is configured to receive said second incoming signal and said second outgoing signal and to electronically cancel from said second incoming signal at least a portion of said interference component attributable to the transmission of said second outgoing signal.

27. The multi-unit interference cancellation system of claim 26, wherein said first interference cancellation system further comprises a first digital interference cancellation module, wherein said first digital interference cancellation module is configured to receive an output of said first optical interference cancellation module and said first outgoing signal, and wherein said first digital interference cancellation module is capable of real-time interference cancellation by: (a) generating a channel frequency response estimate of said first outgoing signal, (b) using said channel frequency response estimate to create digital samples of said first outgoing signal, and (c) removing said digital samples from said first received signal.

28. The multi-unit interference cancellation system of claim 27, wherein said second interference cancellation system further comprises a second digital interference cancellation module, wherein said second digital interference cancellation module is configured to receive an output of said first electronic interference cancellation module and said second outgoing signal, and wherein said second digital interference cancellation module is capable of real-time interference cancellation by: (a) generating a channel frequency response estimate of said second outgoing signal, (b) using said channel frequency response estimate to create digital samples of said second outgoing signal, and (c) removing said digital samples from said second received signal.

29. The multi-unit interference cancellation system of claim 26, wherein said first interference cancellation system further comprises:
- an interference estimation module, wherein said interference estimation module is configured to: (a) receive said first incoming signal, (b) estimate an interference component of said first incoming signal, and (c) output said estimated interference component; and,
- a second optical interference cancellation module in communication with said interference estimation module, wherein said second optical interference cancellation module is configured to receive an output of said first optical cancellation module and to receive said estimated interference component and to optically cancel from said output of said first optical cancellation system at least a portion of said estimated remote interference component.

30. The multi-unit interference cancellation system of claim 29, wherein said first interference cancellation system further comprises a first digital interference cancellation module, wherein said first digital interference cancellation module is configured to receive an output of said first optical interference cancellation module and said first outgoing signal, and wherein said first digital interference cancellation module is capable of real-time interference cancellation by: (a) generating a channel frequency response estimate of said first outgoing signal, (b) using said channel frequency response estimate to create digital samples of said first outgoing signal, and (c) removing said digital samples from said first received signal.

31. The multi-unit interference cancellation system of claim 30, wherein said second interference cancellation system further comprises a second digital interference cancellation module, wherein said second digital interference cancellation module is configured to receive an output of said first electronic interference cancellation module and said second outgoing signal, and wherein said second digital interference cancellation module is capable of real-time interference cancellation by: (a) generating a channel frequency response estimate of said second outgoing signal, (b) using said channel frequency response estimate to create digital samples of said second outgoing signal, and (c) removing said digital samples from said second received signal.

32. The interference cancellation system of claim 29, wherein said second optical interference cancellation module comprises a multipath component compensation system, wherein said multipath component compensation system is configured to estimate multipath components of said first incoming signal, and wherein said second optical interference cancellation module is further configured to optically cancel at least a portion of said multipath components from said first incoming signal.

33. The multi-unit interference cancellation system of claim 26, wherein said first interference cancellation system further comprises:
an interference estimation module, wherein said interference estimation module is configured to: (a) receive said first incoming signal, (b) estimate an interference component of said first incoming signal, and (c) output said estimated interference component; and,
a second optical interference cancellation module in communication with said interference estimation module, wherein said second optical interference cancellation module is configured to receive an output of said first optical cancellation module and to receive said estimated interference component and to optically cancel from said output of said first optical cancellation system at least a portion of said estimated remote interference component.

34. The multi-unit interference cancellation system of claim 33, wherein said first interference cancellation system further comprises a first digital interference cancellation module, wherein said first digital interference cancellation module is configured to receive an output of said first optical interference cancellation module and said first outgoing signal, and wherein said first digital interference cancellation module is capable of real-time interference cancellation by: (a) generating a channel frequency response estimate of said first outgoing signal, (b) using said channel frequency response estimate to create digital samples of said first outgoing signal, and (c) removing said digital samples from said first received signal.

35. The multi-unit interference cancellation system of claim 34, wherein said second interference cancellation system further comprises a second digital interference cancellation module, wherein said second digital interference cancellation module is configured to receive an output of said first electronic interference cancellation module and said second outgoing signal, and wherein said second digital interference cancellation module is capable of real-time interference cancellation by: (a) generating a channel frequency response estimate of said second outgoing signal, (b) using said channel frequency response estimate to create digital samples of said second outgoing signal, and (c) removing said digital samples from said second received signal.

36. The interference cancellation system of claim 33, wherein said first optical interference cancellation module comprises a multipath component compensation system, wherein said multipath component compensation system is configured to estimate multipath components of said first incoming signal, and wherein said second optical interference cancellation module is further configured to optically cancel at least a portion of said multipath components from said first incoming signal.

37. An interference cancellation system, comprising:
a first electro-optic modulator for receiving a first electrical signal; and
a multipath component compensation system comprising an optical coupler and one or more branches connected to said coupler, each said branch comprising: (a) an arrayed waveguide grating weighting network; (b) an electro-optic modulator biased for parallel counter-phase modulation with said first electro-optic modulator; (c) at least one optical attenuator; and, (d) at least one optical delay; wherein said multipath component compensation system is configured to receive a second electrical signal combined with said first electrical signal, and to estimate multipath components of said second electrical signal; and,
an optical coupler connected to said first electro-optic modulator and said multipath component compensation system.

38. An interference cancellation system, comprising:
a phased array of receiving antennas, each antenna capable of receiving a first signal;
a transmitter, in close proximity to said phased array of receiving antennas, said transmitter capable of transmitting a second signal;
an optical interference cancellation module, wherein said optical interference cancellation module is configured to receive said first signal and said second signal, and to optically cancel from said first signal at least a portion of an interference component attributable to the transmission of said second signal;
a beam steering module, wherein said beam steering module is configured to receive said first signal, to calculate an angle of arrival of said first signal at said phased array, and to remove any signal components included in said first signal that arrived at said phased array from an angle of arrival associated with one or more sources of interference; and,
an adaptive processing module, wherein said adaptive processing module is configured to receive said first signal, to estimate said first signal in the presence of co-located and remotely located interference, and to remove said co-located and remotely located interference from said first signal.

39. An interference cancellation system, comprising:
a receiver coupled to a single receiving antenna or array, the receiver being configured to receive a first signal;
means for estimating an interference component of said first signal; and
means for optically canceling said interference component of said first signal.

40. The interference cancellation system of claim 39, further comprising means for optically cancelling multipath components of said interference component.

41. The interference cancellation system of claim 40, further comprising:
a transmitter in close proximity to said receiver, said transmitter capable of transmitting a second signal; and,
means for optically canceling from said first signal an interference component attributable to the transmission of said second signal.

42. The interference cancellation system of claim 41, wherein said receiver comprises a phased array of antennas.

43. The interference cancellation system of claim 42, further comprising means for removing signal components with an angle of arrival associated with known sources of interference.

44. A method of cancelling interference, comprising:
    receiving first signal at a receiver coupled to a single receiving antenna or array;
    estimating an interference component of said first signal using an interference estimation module; and
    optically cancelling said interference component of said first signal using an optical interference cancellation system.

45. The method of claim 44, wherein said receiver is a phased array of antennas.

46. The method of claim 45, further comprising calculating an angle of arrival of said first signal at said phased array with a beam steering module; and using said beam steering module to remove any signal components included in said first signal that arrived at said phased array from an angle of arrival associated with one or more sources of interference.

47. The method of claim 44, further comprising estimating said first signal with an adaptive processing module and removing any co-located and remotely located interference from said first signal using said adaptive processing module.

* * * * *